(12) United States Patent
Bhola et al.

(10) Patent No.: US 12,517,885 B2
(45) Date of Patent: Jan. 6, 2026

(54) SYSTEMS AND METHODS FOR RANGE KEYS TO ENABLE EFFICIENT BULK WRITES IN LOG-STRUCTURED MERGE TREE STORAGE

(71) Applicant: Cockroach Labs, Inc., New York, NY (US)

(72) Inventors: Sumeer Kumar Bhola, Brooklyn, NY (US); Jackson Blair Owens, Brooklyn, NY (US)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 17/968,370

(22) Filed: Oct. 18, 2022

(65) Prior Publication Data

US 2024/0126738 A1    Apr. 18, 2024

(51) Int. Cl.
*G06F 16/00* (2019.01)
*G06F 16/22* (2019.01)
*G06F 16/27* (2019.01)

(52) U.S. Cl.
CPC .......... *G06F 16/2282* (2019.01); *G06F 16/27* (2019.01)

(58) Field of Classification Search
CPC ............................ G06F 16/2282; G06F 16/27
USPC .......................................................... 707/741
See application file for complete search history.

(56) References Cited

U.S. PATENT DOCUMENTS

| | | | |
|---|---|---|---|
| 10,445,022 B1 * | 10/2019 | Qui ........................ | G06F 3/0661 |
| 2013/0275656 A1 * | 10/2013 | Talagala .............. | G06F 12/0246 |
| | | | 711/103 |
| 2022/0043585 A1 * | 2/2022 | Senyuk ................... | G06F 16/27 |

* cited by examiner

*Primary Examiner* — Chelcie L Daye
(74) *Attorney, Agent, or Firm* — Goodwin Procter LLP

(57) ABSTRACT

Methods and systems for implementing ranged operations in a distributed computing system are provided. A write operation is received from a client device, wherein the write operation is configured to associate a range key and range key value with a range of key-value (KV) pairs included in a sorted key space, wherein the range corresponds to a key span of the sorted key space defined by a start boundary key and an end boundary key. A range key and range key value is written for the range based on the write operation, wherein an iterator is configured to read a respective value of a KV pair of the range and/or the range key value based on a position of the iterator within the key span.

18 Claims, 16 Drawing Sheets

SYSTEMS AND METHODS FOR RANGE KEYS TO ENABLE EFFICIENT BULK WRITES IN LOG-STRUCTURED MERGE TREE STORAGE

FIELD OF TECHNOLOGY

The present disclosure relates generally to methods and systems for operating with key-value data of a database and more particularly, to encoding and operating with range keys corresponding to key-value data of log-structured merge tree storage.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range includes one or more key-value (KV) pairs and can be replicated among one or more nodes of the cluster. A range may be a partition of a data table ("table"), where a table may include one or more ranges.

In some cases, log-structured merge (LSM) tree storage systems can be used to organize mutable (e.g., changeable) data in KV data stores and/or databases. LSM trees can store a key space of data in immutable (e.g., unchangeable) data files containing one or more KV pairs, where the KV pairs can be sorted in key order. In some cases, sorting KV pairs in key order can include sorting the KV pairs by key prefix in ascending byte lexicographic order. In some cases, for keys with equivalent prefixes, the keys may be sorted by key suffix in descending order (e.g., according to a version and/or timestamp), such that newer, more recent keys of a prefix sort before older, less recent keys of the same prefix. The data files stored by LSM trees can be referred to as "sorted string tables" or "sstables". In some cases, a KV pair can map a single byte string key to a single byte string value. Properties of sstables can vary across popular LSM tree implementations, with common properties of sstables including a series of data blocks each including one or more KV pairs. Further, popular LSM tree implementations commonly enable abilities to read, insert, update, and delete individual KV pairs included in the sstables. Such abilities can support efficient lookup and scans of the data included in the sstables.

In some cases, for an LSM tree, keys that are sorted near each other can be related. For example, in a relational database using an LSM tree storage system, proximally located keys can map to the same SQL table or share the same value for an indexed column within a secondary index. Because of this property, it is a common practice to mutate a contiguous span of the KV pairs in a database. As an example, dropping (e.g., deleting) a table may require deleting all KV pairs corresponding to keys in a range defined by [start-key-string, end-key-string), where "start-key-string" refers to a key indicative of the start of the interval and "end-key-string" refers to a key indicative of the end of the interval. A transaction (e.g., SQL transaction) used to delete the keys in the range defined by [start-key-string, end-key-string) may be required to acquire a lock over a key span (e.g., keys spanned by a defined interval), where the lock prevents existing keys within the key span from being modified and prevents new keys from being inserted into the key span.

In some cases, bulk operations (e.g., such as a bulk delete operation) over a key space may be implemented using conventional techniques. As an example, conventional techniques can include scanning all the KV pairs within a range (e.g., defined as [start-key-string, end-key-string)) and writing an update for each individual key. This conventional technique has the disadvantage that the number of reads and writes performed grows proportionally with the number of KV pairs included in the range, thereby increasing the disk input/output (TO) at a node and creating significant LSM tree compaction work. Other bulk operations (e.g., operations directed to a continuous key span) cannot conventionally be applied as a batch of KV pair updates. For example, a lock that must prevent the insertion of new KV pairs within the range defined as [start-key-string, end-key-string) cannot be discretized as described for a bulk delete operation because an infinite number of possible keys exist between a start-key-string and an end-key-string.

Further, in multi-version concurrency control (MVCC) systems, it can be necessary to perform bulk "soft" delete operations that mark all KV pairs in a range defined as [start-key-string, end-key-string) as deleted at a specific timestamp, while maintaining the deleted KV pairs for historical timestamps before the specific timestamp. Read operations at more recent (e.g., later) timestamps must not observe the soft-deleted keys, but historical reads using a timestamp before (e.g., earlier than) the bulk delete operation must observe the soft-deleted keys. Such techniques pose problems including: (i) requiring a write operation per soft-deleted key; and (ii) skipping over each of the soft-deleted keys when reading the range at a current (e.g., present) timestamp. Accordingly, improved systems and methods are desired that enable ranged operations with user-defined semantics over an LSM tree storage system.

SUMMARY

Methods and systems for implementing ranged operations using range keys are disclosed. In one aspect, embodiments of the invention feature a method for implementing ranged operations in a distributed computing system comprising a plurality of computing nodes. According to one embodiment, the method can include receiving, from a client device, a write operation configured to associate a range key and range key value with a range of key-value (KV) pairs included in a sorted key space, wherein the range corresponds to a key span of the sorted key space defined by a start boundary key and an end boundary key. The method can include writing, based on the write operation, the range key and the range key value for the range, wherein an iterator is configured to read a respective value of a KV pair of the range and/or the range key value based on a position of the iterator within the key span.

In some embodiments, the range key can include an identifier and a first timestamp. A log-structured merge tree storage engine can include the sorted key space. The method can further include receiving, from the client device, a read operation directed to at least one of the KV pairs of the range, wherein the read operation comprises a second timestamp. The method can further include sending at least one respective value of the at least one of the KV pairs to the client device based on a determination that the second timestamp is less than a timestamp parameter received from the client device. The write operation can include a first timestamp. The method can further include comparing the first timestamp to the second timestamp; and based on the comparison, sending at least one respective value of the at least one of the KV pairs to the client device or not observing the at least one respective value.

In some embodiments, wherein the sending the at least one respective value of the at least one of the KV pairs to the client device can further include: based on a determination that the first timestamp is greater (e.g., more recent) than the second timestamp: reading, by iterator, the at least one respective value from the at least one of the KV pairs; and sending the at least one respective value of the at least one of the KV pairs to the client device. The not observing the at least one respective value can further include: based on a determination that the first timestamp is less (e.g., less recent) than or equal to the second timestamp: not observing the at least one respective value; and sending an empty value to the client device. The method can further include receiving, from a client device, a second write operation configured to delete the range key and the range key value for at least one KV pair of the range of KV pairs; and deleting the range key and the range key value for the at least one KV pair of the range of KV pairs. The second write operation can further include a second timestamp. The deleting the range key and the range key value for the at least one KV pair of the range of KV pairs can be based on the first timestamp being equivalent to the second timestamp. The second write operation can be further configured to delete the range key and the range key value for the range of KV pairs. The method can further include deleting the range key and the range key value for the range of KV pairs.

In another aspect, the invention features a system for implementing ranged operations. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
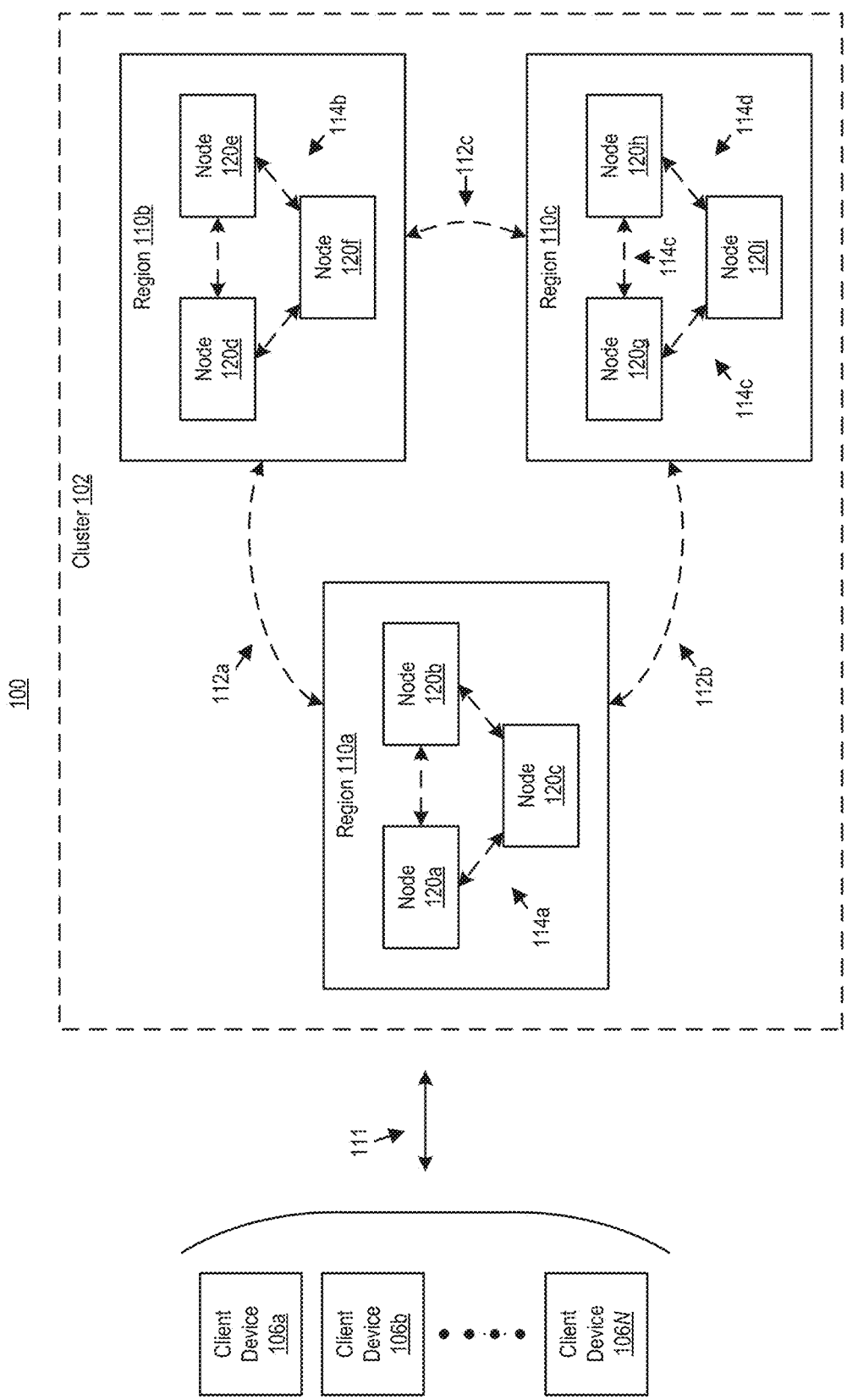
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for operating with KV data of LSM tree storage using range keys are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, conventional LSM tree storage systems have traditionally been used to only store KV pairs that map a single byte string key to a single byte string value. Such an interface is the primary interface of popular LSM tree-based storage engines. Using such LSM tree implementations, frequent operations can include performing a "hard" delete of a range of KV pairs in an LSM tree. For example, a deleted SQL table may correspond to a contiguous key space as defined as [start-key-string, end-key-string) in the LSM tree. In some cases, as described above, a client may wish to remove all KV pairs within a contiguous range as defined as [start-key-string, end-key-string), ensuring that they're hidden from subsequent iteration and that storage space (e.g., disk space) corresponding to the deleted KV pairs is reclaimed.

Some popular LSM trees have implemented a hard delete operation (referred to as a "DeleteRange" operation) to efficiently (e.g., cheaply) perform hard delete operations. Such a DeleteRange operation can delete a selected key span and write a single tombstone key encoding the deleted range. A tombstone key may provide an indication that the KV data corresponding to the selected key span was deleted. Iterators that iterate over the LSM tree can transparently hide keys that fall within the deleted range at a time of a read operation and LSM compaction operations can ensure that any KV pairs with keys within the deleted range are removed from durable storage.

As described herein, the existing DeleteRange operation provided by some LSM implementations is specifically tailored for hard deletes, where a client only provides a key span defined as [start-key-string, end-key-string) to delete. The specificity of this operation makes it incompatible with implementing MVCC soft deletes, which require associating a timestamp with a delete and maintaining deleted data indefinitely. Further, it is not possible to use a DeleteRange operation to implement a ranged-locking mechanism. Accordingly, generalized range keys are introduced for use with LSM tree storage systems that generalize the concept of range keys to support arbitrary ranged operations (e.g., beyond only hard delete operations).

Generalized range keys are a new, added key in a LSM tree-based database (e.g., including a sorted key space) that map a continuous key range defined as [start-key-string, end-key-string), and an optional secondary key, to a value. Range keys enable an LSM tree to record arbitrary state updates over a continuous key range using a constant number of writes at commit time. Iterators that operate over and read from the LSM tree view the keys corresponding to respective KV pairs that are defined as discrete byte strings. A key included in a KV pair may be referred to as a "point" key. Further, the iterators may simultaneously view all overlapping "range" keys corresponding to the point keys. Accordingly, range keys provide a new primitive attribute to an LSM tree that may be used to implement ranged operations with semantics defined by the user. An "iterator" as referred to herein may read one or more KV pairs within an LSM tree in key order at a consistent snapshot (e.g., instance in time). An iterator may perform iteration in response to a user query (e.g., originating via a client device) directed to one or more keys and/or respective values. An iterator may perform iteration in response to a user operation (e.g., originating via a client device) directed to one or more keys and/or respective values. A type of an iterator used to perform iteration may cause the iterator to surface point keys and/or range keys as described herein.

In some cases, generalized range keys may be used to efficiently implement the MVCC range delete operation described above. An MVCC range delete operation may write a range key over the soft deleted key range defined as [start-key-string, end-key-string) and use the range key's optional secondary key to store a timestamp at which the delete operation is performed. The range key may include an indication that the KV pairs corresponding to the range key have been deleted (e.g., soft deleted). Iterators that perform MVCC reads of a particular KV pair can observe both a point key and its timestamp, as well as any range keys encoding MVCC range delete operations corresponding to the point key. As an example, based on receiving an MVCC read operation directed to a point key, an iterator may compare the timestamp corresponding to the point key and the timestamp corresponding to the range key (if present). Based on the comparison, the iterator may skip reading (e.g., not observe) the point key or the iterator may read the value corresponding to the point key. If an iterator skips reading a key, the value corresponding to the skipped key may not be observed by the iterator and may not be returned (e.g., to a client device) in response to the query. For example, if the iterator skips reading a key, the iterator may cause empty or zero rows and/or values corresponding to the skipped key to be returned to the client device. The iterator may skip reading (e.g., not observe) the point key if the timestamp corresponding to the range key is greater (e.g., more recent, newer, etc.) than the timestamp corresponding to the point key. The iterator may read the value corresponding to the point key and may return the read value to the client if the timestamp corresponding to the range key is less (e.g., less recent, older, etc.) than or equal to the timestamp (e.g., historical timestamp) corresponding to the point key.

Generalized range keys can thereby provide a more capable interface than previous LSM implementations. Generalized range keys enable users to associate a key to a value over a continuous key span and surface both range keys and ordinary point keys at read time for a read operation. Surfacing a range key and/or a point key may include reading the respective key and value and making the respective key and value available via the iterator.

Terms

"Cluster" generally refers to a deployment of computing devices that comprise a database. A cluster may be located in one or more geographic locations (e.g., data centers). The one or more geographic locations may be located within a single geographic region (e.g., eastern United States, central United States, etc.) or more than one geographic location. For example, a cluster may be located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard" and/or a "micro-partition". A table and its secondary indexes can be mapped to one or more ranges, where each KV pair in a range may represent a single row in the table (which can also be known as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (known as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row ID (e.g., named rowid) column that uniquely identifies each row of the table as an implicit primary index.

"Replica" generally refers to a copy of a range. A range may be replicated a threshold number of times. For example, a range may be replicated 3 times into 3 distinct replicas. Each replica of a range may be stored on a distinct node of a cluster. For example, 3 replicas of a range may each be stored on a different node of a cluster. In some cases, a range may be required to be replicated a minimum of 3 times.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica.

"Raft log" generally refers to a time-ordered log of write transactions to a range, where the log of write transactions includes write transactions agreed to by a threshold number of the replicas of the range. Each replica of a range may include a raft log stored on the node that stores the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the ranges targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a configured storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on other nodes such that the range can still be accessed by client devices and replicated to other nodes of the cluster.

In some embodiments, operations directed to KV data as described herein may be executed by one or more transactions. In some cases, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time. A timestamp associated with a key (e.g., point key and/or range key) corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node. The transaction may assign the timestamp to the KVs that are subject to the transaction. Timestamps may enable tracking of versions of KVs (e.g., through MVCC as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus algorithm. The storage layer may commit writes from the Raft log to disk (e.g., a computer-readable storage medium on a node), as well as return requested data (e.g., reads) to the replication layer.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions may correspond to cluster regions and databased regions as described further below. A node 120 may be a computing device. In some cases, a node 120 may include at least portions of the computing system as described herein with respect to FIG. 13. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN) and/or a wide area network (WAN). In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN and/or a WAN. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 13. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactions. Each transaction may include one or more requests and/or queries directed to performing one or more operations. A query may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a query to a cluster. A load balancer may route the request from the SQL client to the nodes of the cluster. A gateway node may be a node that processes the request and/or responds to the SQL client. A leaseholder may be a node that serves reads and coordinates writes for a range of keys (e.g., keys indicated in the query) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the SQL syntax of the database(s) stored by the cluster. The gateway node may generate a logical SQL plan based on the request. The logical plan may be converted to a physical plan to traverse the nodes indicated by the request. Based on the completion of request parsing, a SQL executor may execute the logical SQL plan and/or physical plan using the TCS as described herein. A Transaction Coordination Sender (TCS) may perform one or more operations as a part of the transaction layer. The TCS may perform KV operations on a database stored by the cluster. The TCS may account for keys indicated and/or otherwise involved in a transaction. The TCS may package KV operations into a Batch Request as described herein, where the Batch Request may be forwarded on to a Distribution Sender (DistSender) of the gateway node.

A DistSender of a gateway node and/or coordinating node may receive Batch Requests from a TCS of the same node. The DistSender of the gateway node may receive the Batch Request from the TCS. The DistSender may determine the operations indicated by the Batch Request and may determine the node(s) (e.g., the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (e.g., most recent) for any read operation that a given range has served. The comparison may ensure that the write operation has a higher timestamp than the timestamp cache. If a write operation has a lower timestamp than the timestamp cache, the write operation may be restarted at a timestamp higher than the value of the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write to complete. Based on completion of the write, the latch may be released and the subsequent operations can continue. In some cases, a batch evaluator may ensure that write operations are valid. The batch evaluator may determine whether the write is valid based on the leaseholder's data. The leaseholder's data may be evaluated by the batch evaluator based on the leaseholder coordinating writes to the range. If the batch evaluator determines the write to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft operations and write intents, such that the write operation may be replicated to the replicas of the range. The leaseholder may propose the Raft operations to the leader replica of the Raft group (e.g., which is typically the leaseholder). Based on the received Raft operations, the leader replica may send the Raft operations to the follower replicas of the Raft group. If a threshold number of the replicas acknowledge the Raft operations (e.g., the write operations), consensus may be achieved such that the Raft operations may be committed to the Raft log of the leader replica and written to the storage engine. The leader replica may send a command to the follower replicas to write the Raft operations the Raft log corresponding to each of the follower replicas. Based on the leader replica committing the Raft operations to the Raft log, the Raft operations (e.g., the write transaction) may be considered to be committed (e.g., implicitly committed as described herein). The gateway node may configure the status transaction record for the transaction corresponding to the Raft operations to committed (e.g., explicitly committed as described herein).

In some embodiments, based on the leader replica appending the Raft operations to the Raft log, the leader replica may send a commit acknowledgement to the Dist-Sender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the TCS. The TCS may send the values to the SQL layer. In some cases, the TCS may also send a request to the DistSender, wherein the request includes an indication for the Dist-Sender to convert write intents to committed values (e.g., MVCC values). The SQL layer may send the values as described herein to the SQL client that initiated the query.

Read Transaction Execution

Figure 2A:
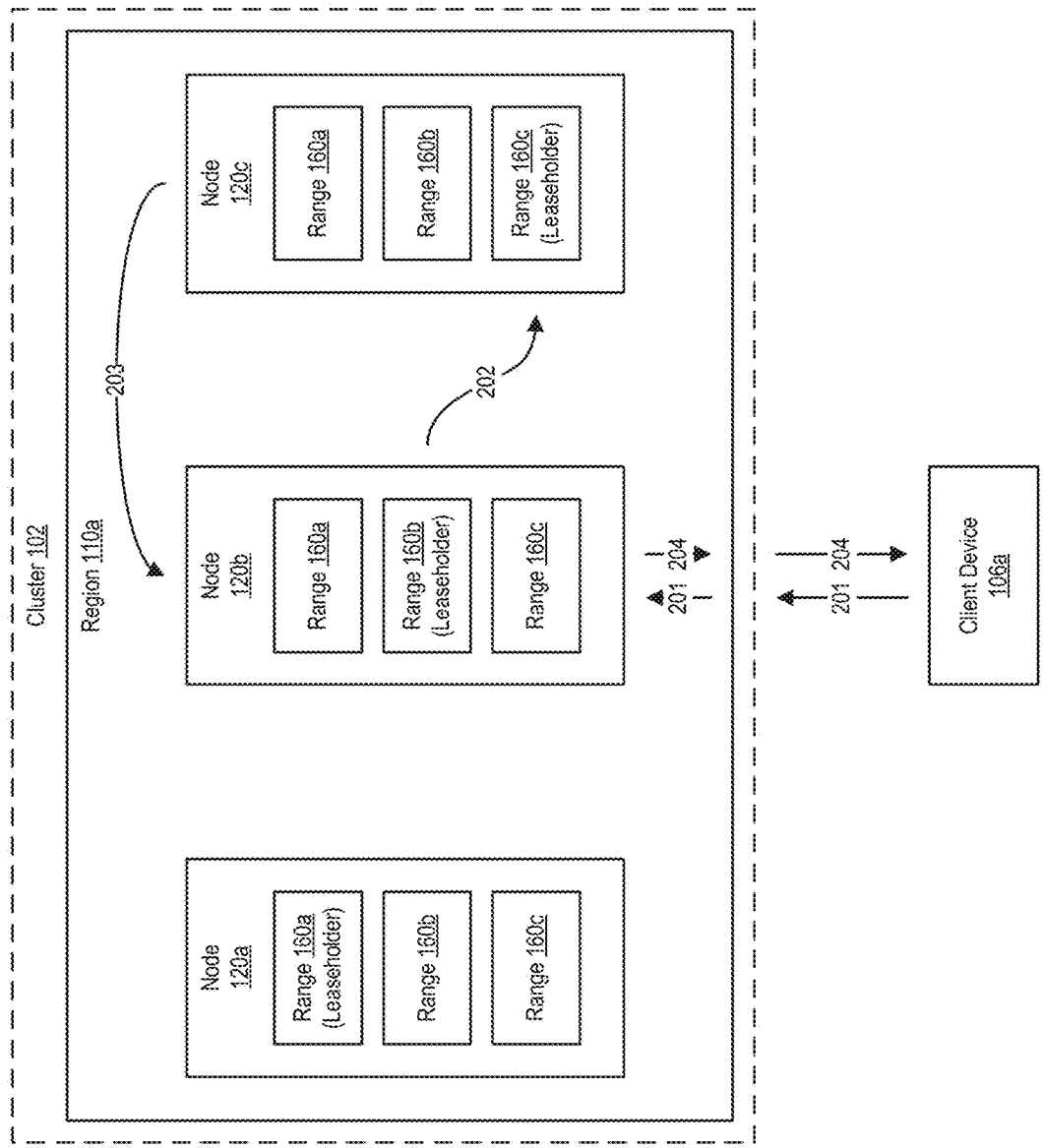
FIG. 2A shows an example of execution of a read transaction at the computing system, according to some embodiments.

Referring to FIG. 2A, an example of execution of a read transaction at the computing system 100 is presented. In some cases, the nodes 120*a*, 120*b*, and 120*c*, of region 110*a* may include one or more replicas of ranges 160. The node 120*a* may include replicas of ranges 160*a*, 160*b*, and 160*c*, wherein ranges 160*a*, 160*b*, and 160*c* are different ranges. The node 120*a* may include the leaseholder replica for range 160*a* (as indicated by "Leaseholder" in FIG. 2A). The node 120*b* may include replicas of ranges 160*a*, 160*b*, and 160*c*. The node 120*b* may include the leaseholder replica for range 160*b* (as indicated by "Leaseholder" in FIG. 2A). The node 120*c* may include replicas of ranges 160*a*, 160*b*, and 160*c*. The node 120*c* may include the leaseholder replica for range 160*c* (as indicated by "Leaseholder" in FIG. 2A). While FIG. 2A is described with respect to communication between nodes 120 of a single region (e.g., region 110*a*), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120*b* as the gateway node. The node 120*b* may be a node 120 located closest to the client device 106, where the closeness between the nodes 120 and a client device 106 may correspond to a latency and/or a proximity as described herein. The read transaction may be directed to data stored by the range 160*c*. At step 202, the node 120*b* may route the received read transaction to node 120*c*. The read transaction may be routed to node 120*c* based on the node 120*c* being the leaseholder of the range 160*c*. The node 120*c* may receive the read transaction from node 120*b* and serve the read transaction from the range 160*c*. At step 203, the node 120*c* may send the read data to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If node 120*b* had been configured to include the leaseholder for the range 160*c*, the node 120*b* may have served the read data to the client device directly after step 201, without routing the read transaction to the node 120*c*.

Write Transaction Execution

Figure 2B:
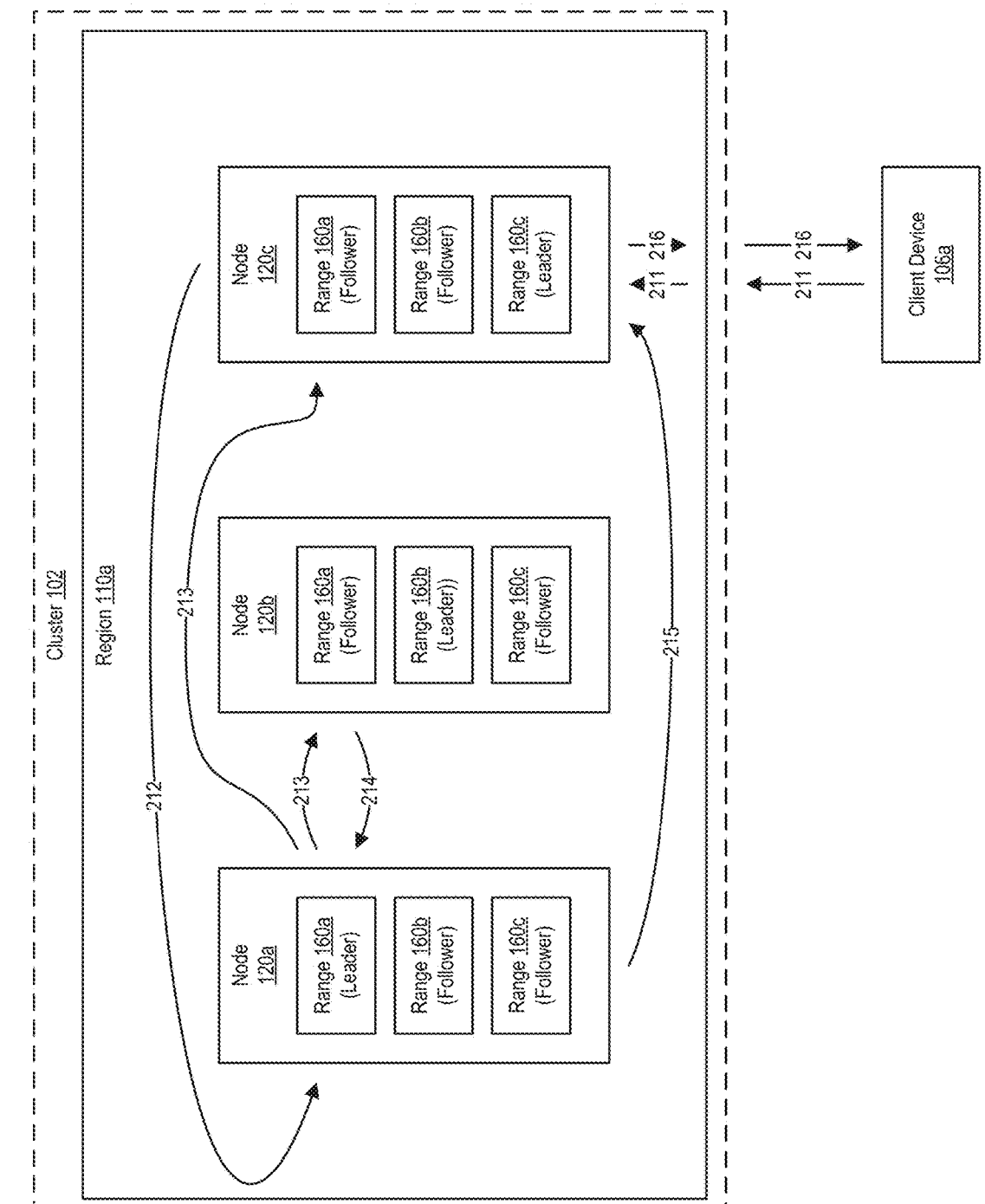
FIG. 2B shows an example of execution of a write transaction at the computing system, according to some embodiments.

Referring to FIG. 2B, an example of execution of a write transaction at the computing system 100 is presented. In some cases, as described herein, the nodes 120*a*, 120*b*, and 120*c*, of region 110*a* may include one or more replicas of ranges 160. The node 120*a* may include replicas of ranges 160*a*, 160*b*, and 160*c*, wherein ranges 160*a*, 160*b*, and 160*c* are different ranges. The node 120*a* may include the leaseholder replica and the leader replica for range 160*a* (as indicated by "Leaseholder" in FIG. 2A and "Leader" in FIG. 2B). The node 120b may include replicas of ranges 160a, 160b, and 160c. The node 120b may include the leader replica for range 160b (as indicated by "Leader" in FIG. 2B). The node 120c may include replicas of ranges 160a, 160b, and 160c. The node 120c may include the leader replica for range 160c (as indicated by "Leader" in FIG. 2B). While FIG. 2B is described with respect to communication between nodes 120 of a single region (e.g., region 110a), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120c as the gateway node. The write transaction may be directed to data stored by the range 160a. At step 212, the node 120c may route the received write transaction to node 120a. The write transaction may be routed to node 120a based on the node 120a being the leaseholder of the range 160a. Based on the node 120a including the leader replica for the range 160a, the leader replica of range 160a may append the write transaction to a Raft log at node 120a. At step 213, the leader replica may simultaneously send the write transaction to the follower replicas of range 160a on the node 120b and the node 120c. The node 120b and the node 120c may append the write transaction to their respective Raft logs. At step 214, the follower replicas of the range 160a (at nodes 120b and 120c) may send an indication to the leader replica of the range 160a that the write transaction was appended to their Raft logs. Based on a threshold number of replicas indicating the write transaction was appended to their Raft logs, the leader replica and follower replicas of the range 160a may commit the write transaction. At step 215, the node 120a may send an acknowledgement of the committed write transaction to the node 120c. At step 216, the node 120c may send the acknowledgement of the committed write transaction to the client device 106a to complete the write transaction.

Storage Layer

In some cases, a storage layer as described herein may be an embedded KV store. The storage layer may enable the cluster to read and write data to storage device(s) of each node. As described herein, data may be stored as KV pairs on the storage device(s) using a storage engine. The storage layer may provide atomic write batches and snapshots, which can indicate a subset of transactions. The storage layer may use an LSM tree to manage data storage. In some cases, the LSM tree is a hierarchical tree. At each level of the tree, there are files on disk that store the data referenced at that level. The files are known as sstables or sstable files. In some cases, sstables are an on-disk representation of sorted lists of KV pairs. Sstable files can be immutable, such that they are never modified, even during the compaction process.

Figure 3:
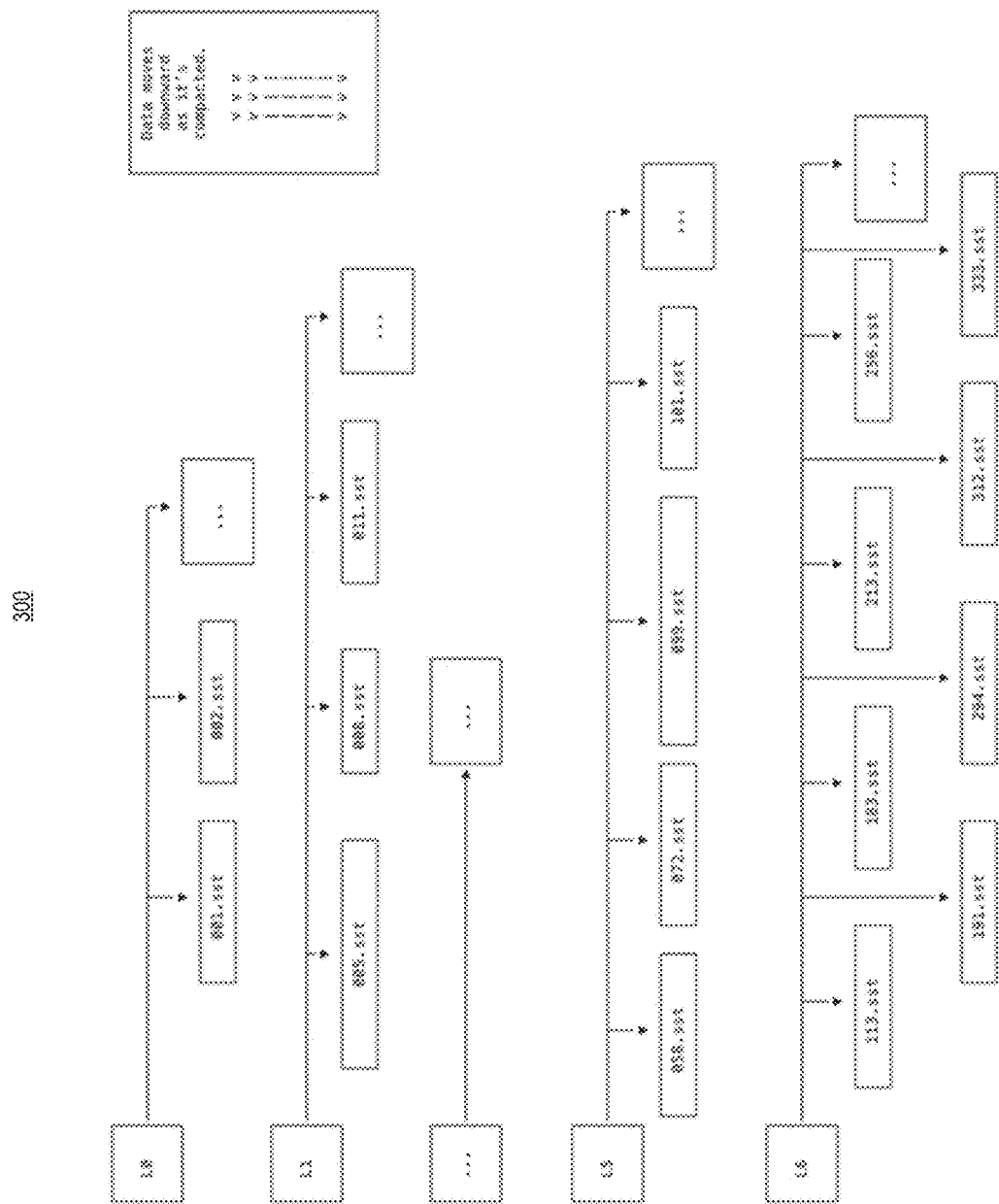
FIG. 3 shows an exemplary illustration of a log-structured merge (LSM) tree of a computing system, according to some embodiments.

In some cases, levels of the LSM tree are organized from L0 to L6, where L0 is the top-most level and L6 is the bottom-most level. New data can be added into L0 (e.g. using insert or import operations) and then merged down into lower levels over time. FIG. 3 shows an exemplary illustration 300 of an LSM tree. Each level of an LSM tree can be associated with a set of sstables, where each sstable is immutable and has a unique, monotonically increasing number. The sstables within each level may be guaranteed to be non-overlapping. For example, if one sstable contains the keys [A-F) (noninclusive), the next will contain keys [F-R), and so on. The L0 level may be a special case being the only level of the tree that is allowed to contain sstables with overlapping keys. This exception to the rule can be necessary to allow LSM-based storage engines to support ingesting large amounts of data, such as when using the import statement. This exception can be necessary to allow for easier and more efficient flushes of memtables as described herein.

In some cases, the process of merging sstables and moving them from L0 down to L6 in the LSM tree is referred to as compaction. The storage engine can work to compact data as quickly as possible. As a result of this process, lower levels of the LSM tree should contain larger sstables that contain less recently updated keys, while higher levels of the LSM tree should contain smaller sstables that contain more recently updated keys.

In some cases, the compaction process is necessary in order for an LSM tree to work efficiently. From L0 down to L6, each level of the tree should have about $\frac{1}{10}$ (10%) as much data as the next level below. For example, L1 should have about $\frac{1}{10}$ as much data as L2, and so on. In some cases, ideally as much of the data as possible will be stored in larger sstables referenced at lower levels of the LSM tree. If the compaction process falls behind, it can result in an inverted LSM tree as described herein.

In some cases, sstable files are never modified during the compaction process. In some cases, new sstables are instead written, and old sstables are deleted. This design takes advantage of the fact that sequential disk access is faster than random disk access.

In some cases, the process of compaction operates as follows: if two sstable files A and B need to be merged, their contents (e.g., KV pairs) are read into memory. From there, the contents are sorted and merged together in memory, and a new file C is opened and written to disk with the new, larger sorted list of KV pairs. Finally, the old files A and B are deleted.

In some cases, to facilitate managing the LSM tree structure, the storage engine maintains an in-memory representation of the LSM tree known as the memtable. In some cases, data from the memtable is periodically flushed to sstable files (e.g., of the LSM tree) on disk. Another file on disk referred to as write-ahead log (WAL) can be associated with each memtable to ensure durability in case of power loss or other failures. The WAL can be where the newest (e.g., freshest or most recent) updates issued to the storage engine by the replication layer are stored on disk. Each WAL may have a 1 to 1 correspondence with a memtable. Each WAL and memtable can be kept in sync and updates from the WAL and memtable can be written to sstables periodically as part of the storage engine's normal operation.

Figure 4:
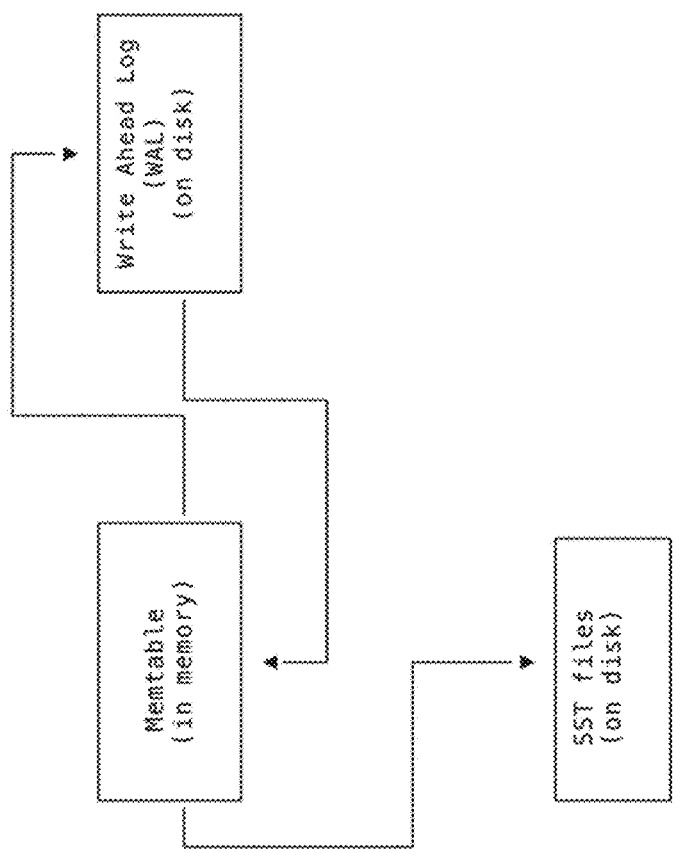
FIG. 4 shows an exemplary block diagram illustrating a storage layer of a computing system, according to some embodiments.

FIG. 4 shows an exemplary block diagram 400 illustrating a relationship between the memtable, the WAL, and the sstable files in the storage layer. New values can be written to the WAL at the same time as the values are written to the memtable. From the memtable, the values can be eventually written to sstable files on disk for longer-term storage.

Background on Sstables

As described herein, LSM tree storage systems can store KV pairs in sstables. In an sstable, KV pairs are stored and sorted by key in a sequence of data blocks. In some cases, an LSM tree storage system may include a number of sstables. Each sstable may correspond to particular key boundaries, such that each sstable included KV entries corresponding to a particular key range. A first sstable of a number of sstables may or may not include keys within a range of a second sstable of the number of sstables. For example, for keys ranging from 1-9 (smallest to largest keys), a first sstable may have a key range of [1, 5) and a second sstable may have a key range of [4, 7). An sstable may be selected from a number of sstables based on a key range of the sstable (e.g., according to a target and/or selected key range indicated by a query). To enable efficient key lookup and range scans, sstables can include an additional index structure. An sstable can include a series of second-level index blocks, where each second-level index block includes a key per data-block (e.g., typically the last key in the data block). An index block can include one or more KV pairs that each map a key to a "BlockHandle" (also referred to as a "block handle"), where the BlockHandle functions as the value in the KV pair. A BlockHandle encodes the location of a block (e.g., index block or data block) within the sstable file, which can be represented as a tuple. An example tuple that represents a BlockHandle may be (file-offset, block-length), where "file-offset" may indicate the location of a data or index block within the sstable file and "block-length" indicates the length of the respective data or index block. Above the second-level index blocks, an sstable can include a single top-level index block that includes a key per second-level index-block (e.g., typically the last key in the second-level block). The top-level index block can map keys to BlockHandles (e.g., where the BlockHandle is the respective value for the key). A BlockHandle can function as a "pointer" that is used to read the associated block (e.g., second-level index block or data block) indicated by the pointer.

Figure 5:
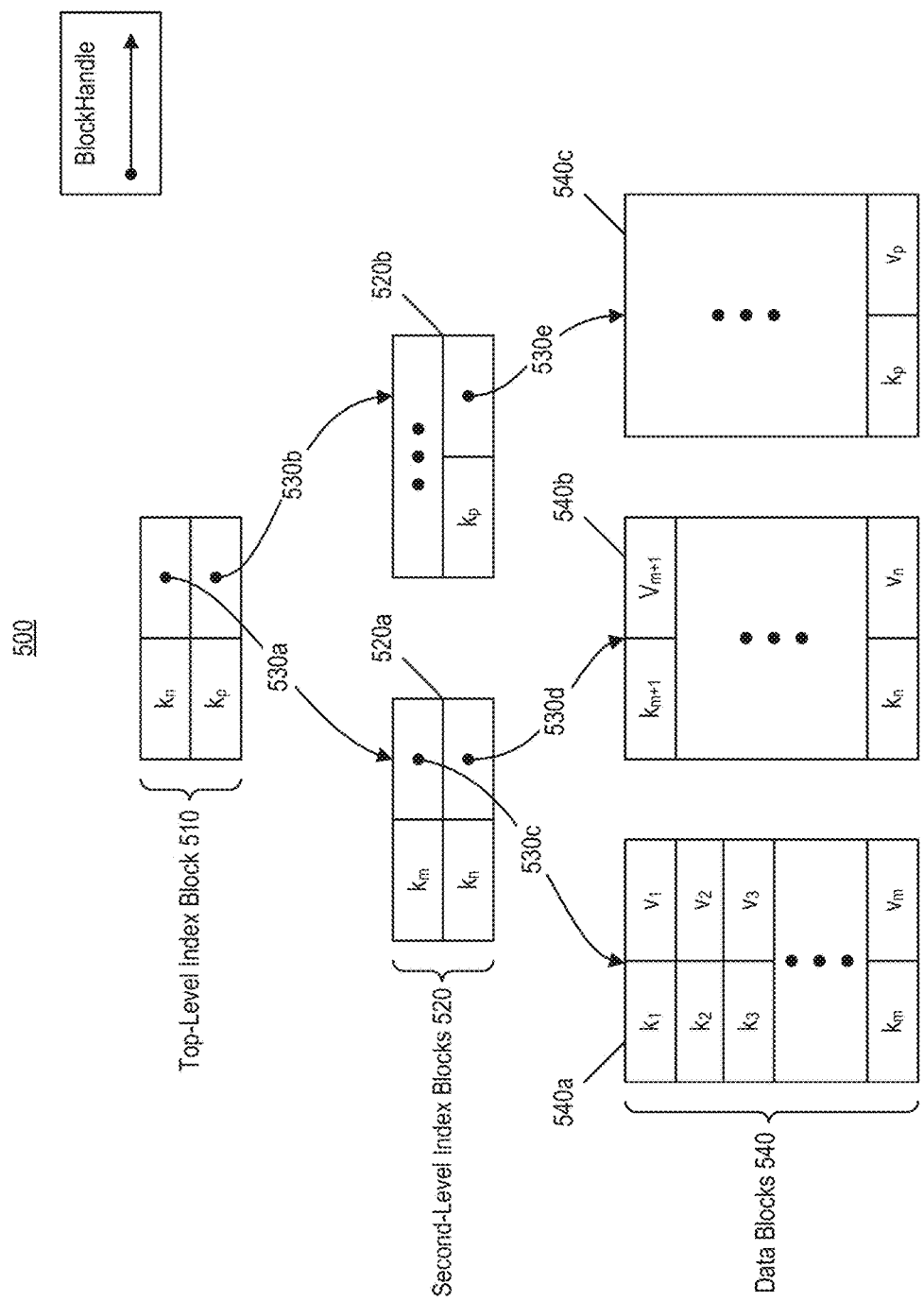
FIG. 5 shows an exemplary illustration of an sstable, according to some embodiments.

FIG. 5 shows an exemplary sstable 500. The sstable 500 includes a top-level index block 510, one or more second level index blocks 520, and one or more data blocks 540. As shown in FIG. 5, "k" refers to a key of a KV pair and "v" refers to a value of a KV pair. The top-level index block 510 includes a key per second-level index block 520 of the sstable 500. As shown in FIG. 5, the top-level index block 510 includes keys $k_n$ and $k_p$ that map to BlockHandles 530a and 530b, respectively. The BlockHandle 530a encodes the location of the second-level index block 520a within the sstable 500. The BlockHandle 530b encodes the location of the second-level index block 520b within the sstable 500. The second-level index blocks 520 include a key per data block 540. As shown in FIG. 5, the second-level index block 520a includes keys $k_m$ and $k_n$ that map to BlockHandles 530c and 530d, respectively, and the second-level index block 520b includes a key $k_p$ that maps to BlockHandle 530e.

Each of the data blocks 540 can include one or more KV pairs. As shown in FIG. 5, for the index and data blocks of the sstable 500, "m", "n", and "p" can refer to any suitable identifier, including integers greater than 0. In some cases, keys in each data block 540 may be sorted. For example, for data block 540a, keys may be sorted from $k_1$ to $k_m$, where m is greater than 1. Keys in each data block may be sorted using any suitable technique including, for example, alphabetically, numerically, and chronologically. As shown in FIG. 5, the data block 540a includes keys $k_1$ to $k_m$ which are mapped to values $v_1$ to $v_m$, respectively. The data block 540b includes keys $k_{m+1}$ to $k_n$ which are mapped to values $v_{m+1}$ to $v_n$, respectively, and where n is greater than m. The data block 540c includes one or more KV pairs, including at least key $k_p$ which is mapped to value $v_p$ to $v_n$. While the sstable 500 is shown as including the top-level index block 510, the second-level index blocks 520a and 520, and the data blocks 540a, 540b, and 540c, the sstable 500 may include any suitable number of second-level index blocks 520 based on any suitable number of data blocks 540.

To query (e.g., search) the sstable 500, an iterator first scans the top-level index block 510 and compares the search key to find the appropriate second-level index block 520. Based on finding the appropriate key in the top-level index block 510, the iterator decodes the BlockHandle stored in the value mapped to the key and loads the referenced second-level index block 520. The iterator can load the second-level index block 520 by reading block-length bytes from the sstable 500 at the file-offset included in BlockHandle tuple. Based on loading the second level index block 520, the iterator can scan the second-level index block 520 and compare the search key to find the appropriate data block 540. Based on finding the appropriate key in the second-level index block 520, the iterator decodes the BlockHandle stored in the value mapped to the key and loads the referenced data block 540. Based on loading the referenced data block, the iterator can scan the data block to identify the KV pair corresponding to the search key.

Interface of Range Keys

In some embodiments, keys (e.g., point keys) in an LSM tree-based storage system using MVCC may be a two-attribute key including a string identifier and a version identifier (e.g., represented as "string@version"). In some cases, the string identifier (e.g., prefix) of the key may be defined by a user via a client device (e.g., client device 106). Implementing range keys for LSM tree storage systems can include adding additional requirements for a storage engine (e.g., Pebble) Comparer type. A Comparer type enables users to optionally specify a Split function that splits a key into a prefix (e.g., string) and a suffix (e.g., version and/or timestamp). The Split function enables users implementing MVCC to provide an indication to the LSM tree storage of which part of the key encodes the prefix and which part of the key encodes the suffix (e.g., version and/or timestamp).

In some embodiments, range keys as described herein introduce stricter requirements for user-provided Split implementations and the ordering of keys. Requirements can include: (i) a key including only a prefix referred to as "k" must sort before all other keys including the prefix k and a suffix (e.g., such that the Go operation for Compare(k[:Split (k)], k)<0 where Split(k)<len(k)); and for keys referred to as "k" and "k2", (ii) a key including only a suffix must be a valid key and comparable and the ordering of the empty prefix with any suffixes must be consistent with the ordering of those same suffixes applied to any other key prefix (e.g., such that the Go operation for Compare(k[Split(k):], k2[Split(k2):])=Compare(k, k2) where Compare(k[:Split (k)], k2[:Split(k2)])==0).

In some embodiments, implementing range keys for LSM tree storage systems can include additional write operations used to configure and modify range keys for a key span. A user may initiate execution of any of the additional write operations described herein at a node (e.g., a node 120) of a cluster (e.g., a cluster 102) via a client device (e.g., a client device 106). The additional write operations can include RangeKeySet([k1, k2), [optional suffix], <value>) for keys referred to as "k1" and "k2", an optional suffix, and a value. The RangeKeySet operation can perform a mapping of [k1, k2)@suffix=>value. Keys k1 and k2 may not include a suffix (e.g., such that the Go operations for Split(k1)=len(k1) and Split(k2)=len(k2)).

In some embodiments, the additional write operations can include RangeKeyUnset([k1, k2), [optional suffix]) for keys referred to as "k1" and "k2" and an optional suffix. The RangeKeyUnset operation can remove a mapping previously applied by a RangeKeySet operation. In some cases, the RangeKeyUnset operation may use a smaller key range (e.g., as defined by keys k1 and k2) than the original RangeKeySet operation, in which case only part of the range is deleted. The RangeKeyUnset operation only applies to range keys with a matching optional suffix. If the optional suffix is absent in range keys configured using the RangeKeySet and RangeKeyUnset operations, the range keys are considered to have matching optional suffixes.

In some embodiments, the additional write operations can include RangeKeyDelete([k1, k2)) for keys referred to as "k1" and "k2". The RangeKeyDelete operation can remove all range keys within the provided key span defined by [k1, k2). The RangeKeyDelete operation behaves like a RangeKeyUnset operation, but it is not restricted by suffix restrictions as described for the RangeKeyUnset operation.

As an example of the additional write operations, keys may be ordered alphabetically from key "a" to key "d". A range key can be added with a value "foo" for a key span defined as [a,d) using RangeKeySet([a,d), foo) (e.g., such that the operation does not include the optional suffix). For a later RangeKeyUnset operation for a key span defined as [b,c) (e.g., RangeKeyUnset([b,c))), a reader would read a resulting state of "[a,b)=>foo" and "[c,d)=>foo" for the now fragmented range key. A value (e.g., foo) of an added range key may not be modified when the range key is fragmented as described above.

In some embodiments, point keys and range keys may not overwrite one another and may have a parallel existence. Delete operations directed to point keys may only apply to point keys. Range key unset operations (e.g., a RangeKeyUnset operation) only apply to range keys. In some cases, users may configure iterators to mask point keys covered by newer range keys as described herein.

In some embodiments, point keys and range keys may use separate range delete operations. A RangeKeyDelete operation may remove part of a range key. A RangeKeyDelete operation may differ from a RangeKeyUnset operation based on the RangeKeyUnset operation requiring matches between suffixes and applying only to range keys. A RangeKeyDelete operation can remove and/or otherwise delete all existing range keys within the key span indicated by the operation for all suffix values (e.g., irrespective of matching suffixes).

In some embodiments, the optional suffix that can be included in RangeKeySet and RangeKeyUnset operations is related to the Comparer. Split operation described herein. In some cases, range keys with different suffixes configured using RangeKeySet and RangeKeyUnset operations may not interact logically and the storage engine (e.g., Pebble) will observably fragment ranges at intersection points of the operations.

In some embodiments, a user may iterate over a key interval defined as [k1, k2) for keys "k1" and "k2" using a selected iterator type. Respective iterator types may be referred to as a point iterator, a range iterator, and a combined iterator (e.g., including both a point and range iterator). A point iterator may only iterate over point keys. A combined iterator may iterate over both point and range keys (if present). A range iterator may only iterate over range keys.

In some embodiments, combined iterators and range iterators may include accessors for range keys and/or point keys. The accessors may be used by and/or accessible via a computing system (e.g., computing system 100) interacting with the LSM storage system described herein. An accessor can include a HasPointAndRange( ) accessor, which may return a Boolean (hasPoint, hasRange) value. The HasPointAndRange accessor may indicate whether there exists a point key, a range key, or both a point key and a range key at a current position of the iterator. The HasPointAndRange( ) accessor may return a "hasPoint" Boolean value (e.g., true or false value) indicative of whether a point key exists at a current position of the iterator. The HasPointAndRange( ) accessor may return a "hasRange" Boolean value indicative of whether a range key exists at a current position of the iterator.

In some embodiments, an accessor can include a RangeKeyChanged( ) accessor, which may return a Boolean value. The RangeKeyChanged accessor can indicate whether the most recent iterator positioning operation resulted in the iterator stepping into or out of a new range key. If the returned Boolean value is true, previously returned range key boundaries and data may be invalidated. If the returned Boolean value is false, previously obtained range key boundaries, suffix, and value buffers may still be valid and may continue to be read by the iterator.

In some embodiments, an accessor can include a Key( ) accessor, which may return a [ ]byte value. The Key( ) accessor may return the key of the KV pair at the current position of the iterator or may return a null and/or empty value if the iterator has completed iteration through the keys. If the iterator is positioned at a position that only corresponds to a range key, Key( ) may return the starting boundary of the range key. If the iterator is positioned at a position that does not only correspond to a range key, Key( ) may return the key corresponding to the point key at the position.

In some embodiments, an accessor can include a RangeBounds( ) accessor, which may return a (start, end [ ]byte) value. The RangeBounds( ) accessor may return the start (inclusive) and end (exclusive) boundaries of the range key corresponding to the current position of the iterator position. The RangeBounds( ) accessor may return null boundaries if there is no range key covering the current position of the iterator and/or if the iterator is not configured to surface range keys (e.g., as described for a point iterator). If the RangeBounds( ) accessor returns valid (e.g., non-null) bounds, the returned start boundary is less than or equal to Key( ) (e.g., a current position of the iterator) and the returned end boundary is greater than Key( ).

In some embodiments, an accessor can include a Value( ) accessor, which may return a [ ]byte value. The Value( ) accessor may return the value of the KV pair at the current position of the iterator or may return a null value if the iterator has completed iteration through the keys. The Value( ) accessor may only return a valid value if the HasPointAndRange( ) accessor returns a Boolean value of "true" for hasPoint at the current position of the iterator.

In some embodiments, an accessor can include a RangeKeys( ) accessor, which may return a [ ]RangeKey value. The RangeKeys( ) accessor may return the range key values and the respective suffixes corresponding to the current iterator position. The range boundaries may be retrieved separately using the RangeBounds( ) accessor as described herein. The returned [ ]RangeKey value may be defined as described in Table 1.

TABLE 1

```
type RangeKey struct {
    Suffix [ ]byte
    Value  [ ]byte
}
```

In some embodiments, when a combined iterator exposes range keys, it exposes all the range keys covering (e.g., corresponding to) a particular point key at the current position of the iterator. During iteration using a combined iterator, an iteration position may surface a point key and/or a range key at the current position of the iterator. The combined iterator can stop at all positions in a key space where: (i) there exists a point key at the position; and (ii) there exists a range key that logically begins at the position.

Figure 6:
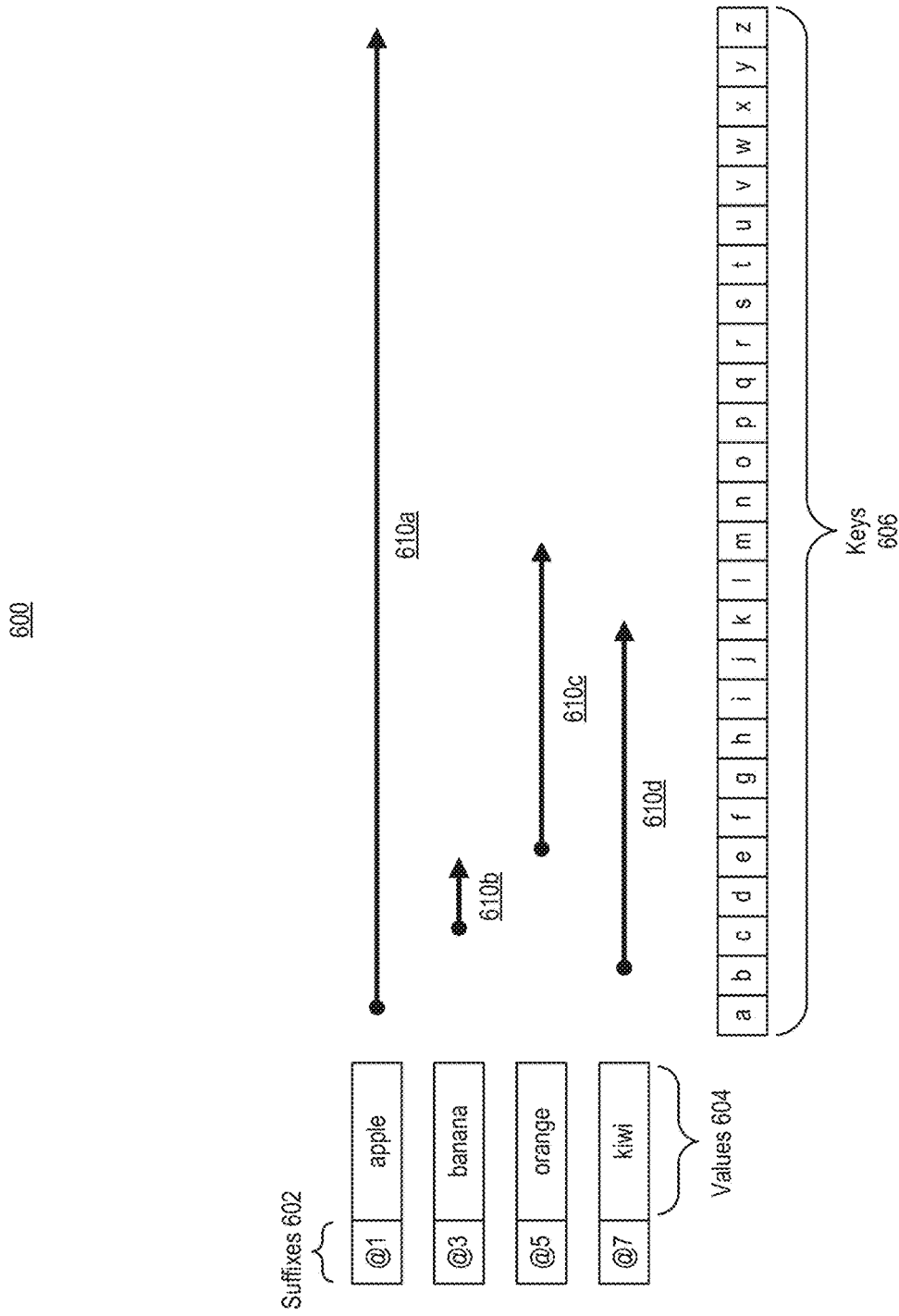
FIG. 6 shows an exemplary illustration of encoded range keys for a key space, according to some embodiments.

In some embodiments, an iterator may additionally stop at keys in-between the above described positions based on fragmentation. FIG. 6 shows an exemplary illustration 600 of encoded range keys 610 for a key space, according to some embodiments. The key space includes keys 606 alphabetically ordered from key "a" to key "z". In some cases, range keys with different suffix values may overlap each other arbitrarily. To surface these arbitrarily overlapping spans (e.g., to a user), the iterator surfaces range keys that are fragmented at intersection points. As shown in FIG. 6, the following sequence of write operations may operate over a key space for keys 606 ordered alphabetically from key "a" to key "z": RangeKeySet([a,z), @1, 'apple'); RangeKeySet ([c,e), @3, 'banana'); RangeKeySet([e,m), @5, 'orange'); and RangeKeySet([b,k), @7, 'kiwi'). Such write operations respectively add: a range key 610a with a suffix 602 of "@1" and a value 604 of "apple"; a range key 610b with a suffix 602 of "@3" and a value 604 of "banana"; a range key 610c with a suffix 602 of "@5" and a value 604 of "orange"; and a range key 610d with a suffix 602 of "@7" and a value 604 of "kiwi".

In some embodiments, during iteration over a key space (e.g., the key space shown in FIG. 6), range keys may be surfaced using the boundaries of their intersection points. As an example, a scan by a range iterator across the key space shown in FIG. 6 and the included range keys 610 would observe iterator positions as shown in Table 2 for the accessors Key( ), RangeBounds( ), and RangeKeys( ) as described herein.

TABLE 2

| Key( ) = a | RangeBounds( ) = [a, b) | RangeKeys( ) = {(@1, apple)} |
| Key( ) = b | RangeBounds( ) = [b, c) | RangeKeys( ) = {(@7, kiwi), (@1, apple)} |
| Key( ) = c | RangeBounds( ) = [c, e) | RangeKeys( ) = {(@7, kiwi), (@3, banana), (@1, apple)} |
| Key( ) = e | RangeBounds( ) = [e, k) | RangeKeys( ) = {(@7, kiwi), (@5, orange), (@1, apple)} |
| Key( ) = k | RangeBounds( ) = [k, m) | RangeKeys( ) = {(@5, orange), (@1, apple)} |
| Key( ) = m | RangeBounds( ) = [m, z) | RangeKeys( ) = {(@1, apple)} |

As shown in Table 2, the iterator observes iterator positions at keys a, b, c, e, k, and m that each correspond to respective range key boundaries (e.g., surfaced by RangeBounds( )) and range key values (e.g., surfaced by RangeKeys( )). Such fragmentation enables a more understandable interface and avoids causing iterators (e.g., combined or range iterators) to read all range keys within the boundaries of the broadest range key during iteration.

Figure 7:
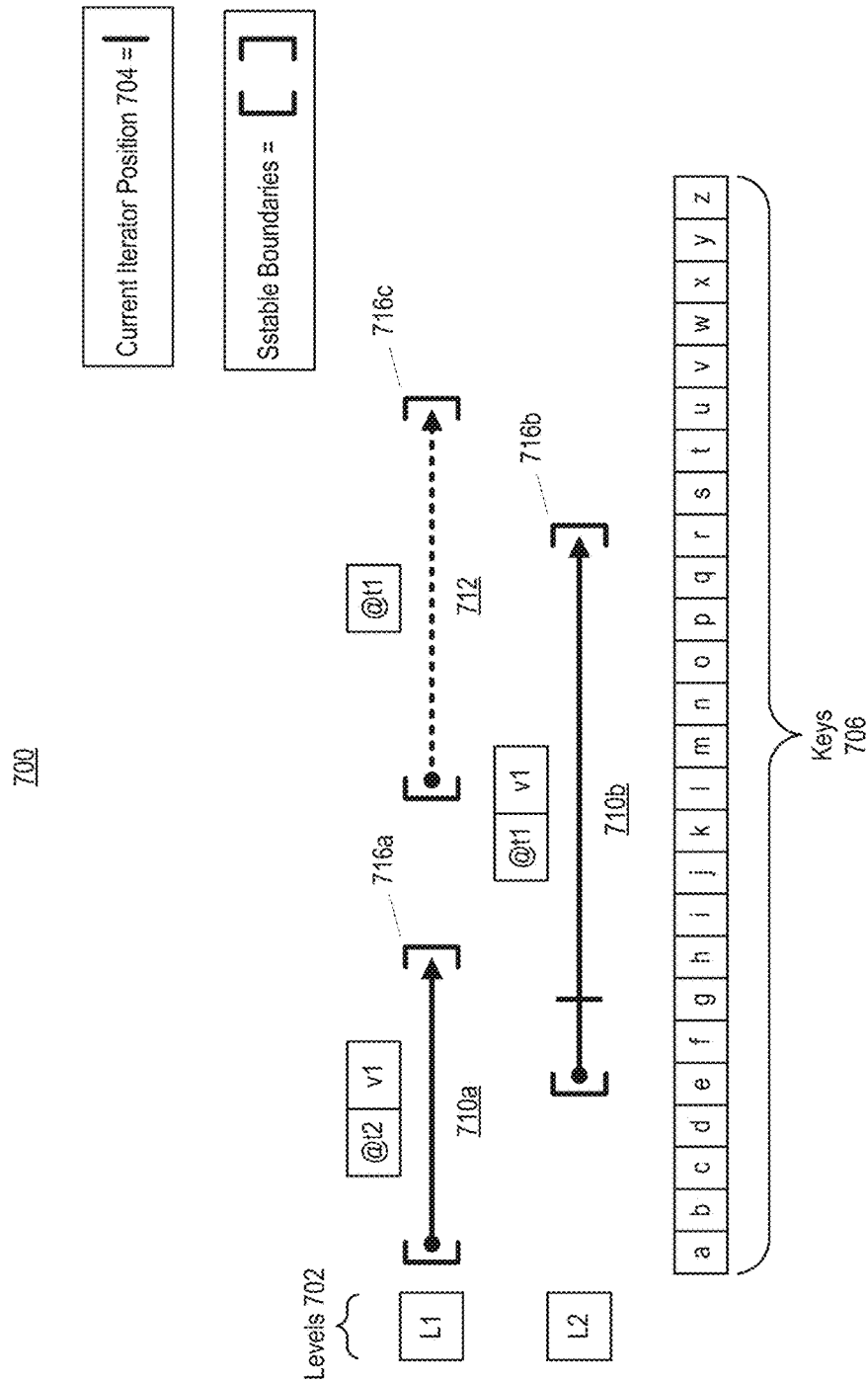
FIG. 7 shows an exemplary illustration of encoded range keys for a key space of an LSM tree, according to some embodiments.

FIG. 7 shows an exemplary illustration 700 of encoded range keys 710 for a key space of an LSM tree, according to some embodiments. As described herein, an LSM tree may include levels organized from L0 to L6, where L0 is the top-most level and L6 is the bottom-most level. FIG. 7 shows levels corresponding to level L1 and level L2. Each level of the LSM tree can include one or more sstables 716 that are defined by respective boundaries 718. Each level of the LSM tree may include one or more encoded range keys 710 for the key space defined by the keys 706. A current position of an iterator 704 is shown in FIG. 7 at key 706 "g". Timestamps t1 and t2 may correspond to the range keys 710, where t2>t1. For the current iterator position 704 at key g, the range keys 710a and 710b are physically overlapping. The range key 710a may be encoded using a RangeKeySet ([a,h), [@t2], <v1>), where the range key 710a is encoded for the interval defined as [a,h), the suffix @t2, and the value v1. An sstable 716a corresponding to the level L0 may have boundaries defined by the interval of [a,h) and may include keys 706 corresponding to the range key 710a. The range key 710b may be encoded using a RangeKeySet([e,r), [@t1], <v1>), where the range key 710b is encoded for the interval defined as [e,r), the suffix @t1, and the value v1. An sstable 716b corresponding to the level L2 may have boundaries defined by the interval of [e,r) and may include keys 706 corresponding to the range key 710a.

In some embodiments, a RangeKeyUnset operation may remove part or all of an existing range key. In FIG. 7, a RangeKeyUnset([l,u), @t1) operation is represented by the dashed identifier 712, which may remove part of the range key 710b encoded using the RangeKeySet([e,r), @t1, v1) operation. An sstable 716c corresponding to the level L1 may have boundaries defined by the interval of [l,u), where the sstable 716c is subject to the RangeKeyUnset([l,u), @t1) operation. After execution of the RangeKeyUnset([l,u), @t1) operation, the range key 710b may be truncated to the boundaries defined as [e,l) (not shown in FIG. 7). An iterator (e.g., combined or range iterator) iterating the key span defined by the keys 706 may be required to return the truncated boundaries that correctly respect the RangeKeyUnset([l,u), @t1) operation. In some cases, when the range keys 710 are stored within an LSM tree, a RangeKeyUnset operation may not be contained within an sstable of the respective level that overlaps the current position of the iterator 704. For example, as shown in FIG. 7, the RangeKeyUnset([l,u), @t1) corresponds to level L1, while the current position of the iterator 704 is at key g in level L2.

To observe the RangeKeyUnset([l,u), @t1) operation, the iterator could read an unbounded number of sstables, thereby losing the LSM tree's property that limits read amplification to a number of levels included in the LSM tree. Accordingly, the iterator may fragment range keys at intersection points. Accordingly, if the iterator's current position 604 is key g as described herein, the iterator may return boundaries of [e,h) for the RangeBounds( ) accessor at key g. Such boundaries [e,h) are the widest boundaries for which the iterator can guarantee that t2 maps to v1 and t1 maps to v1 without loading additional sstables.

Figure 8:
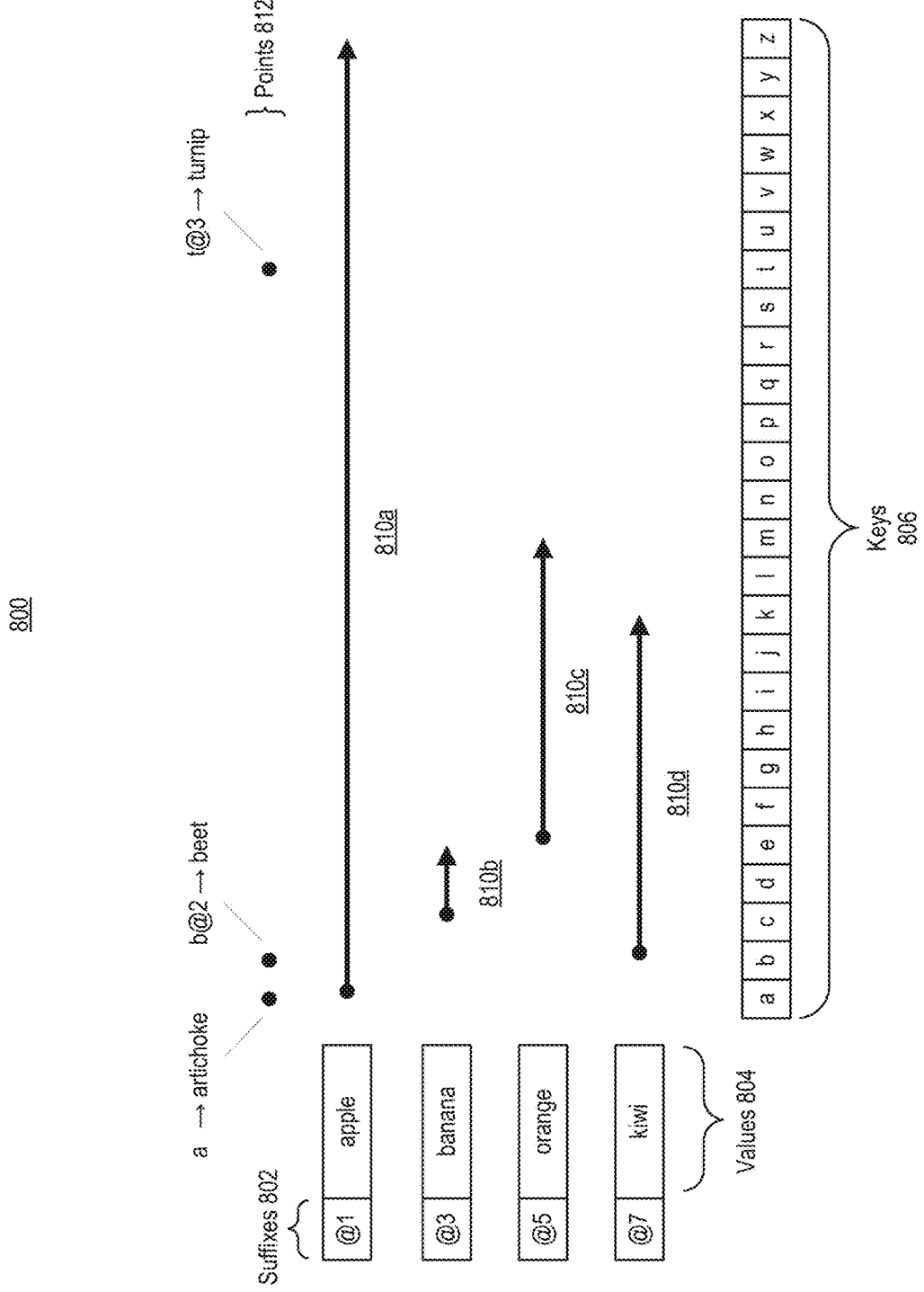
FIG. 8 shows an exemplary illustration of encoded range keys and point keys for a key space, according to some embodiments.

In some embodiments, for a key referred to as "k", the Comparer.Split(k) function divides all point keys into a prefix and a suffix, such that the prefix is equivalent to k[Split(k)] and the suffix is equivalent to k[Split(k):]. If a key does not include a suffix (e.g., a version and/or timestamp), the key can be equivalent to the key's prefix. In some cases, a combined iterator that is configured to surface range keys and point keys can surface all range keys covering a current Key( ) position of the iterator. FIG. 8 shows an exemplary illustration 800 of encoded point keys 806 and range keys 810 for a key space, according to some embodiments. The key space includes keys 806 (also referred to as "point keys") alphabetically ordered from key "a" to key "z". As shown in FIG. 8, the following sequence of write operations may operate over a key space for keys 806 ordered alphabetically from key "a" to key "z": RangeKeySet([a,z), @1, 'apple'); RangeKeySet([c,e), @3, 'banana'); RangeKeySet ([e,m), @5, 'orange'); and RangeKeySet([b,k), @7, 'kiwi'). Such write operations respectively add: a range key 810a with a suffix 802 of "@1" and a value 804 of "apple"; a range key 810b with a suffix 802 of "@3" and a value 804 of "banana"; a range key 810c with a suffix 802 of "@5" and a value 804 of "orange"; and a range key 810d with a suffix 802 of "@7" and a value 804 of "kiwi".

In some embodiments, a key space may include one or more keys 806 mapped to written values. As shown in FIG. 8, respective values and optional suffixes may be written for keys 806 indicated by the points 812 to form KV pairs. An encoded point 812 may correspond to key a and have a written value of "artichoke" (e.g., according to the mapping of key a→artichoke). An encoded point 812 may correspond to key b, have a written suffix (e.g., version and/or timestamp) of @2, and have a written value of "beet" (e.g., according to the mapping of key b@2→beet). An encoded point key 812 may corresponding to key t, have a written suffix (e.g., version and/or timestamp) of @3, and have a written value of "turnip" (e.g., according to the mapping of key t@3→turnip). As described herein, suffixes included for keys b and c can be referred to in an "@<number>" format, where "<number>" refers to an MVCC timestamp. In some cases, higher, more-recent timestamps are sorted in the key space before lower, older timestamps. As an example, for encoded keys d@2 and d@1, d@2 may be sorted before d@1.

In some embodiments, with respect to the range keys 810 and keys 806 of FIG. 8, a combined iterator configured to surface both point and range keys will iterate to the positions described in Table 3 during forward iteration.

TABLE 3

| Key( ) | HasPointAndRange( ) | Value( ) | RangeBounds( ) | RangeKeys( ) |
|---|---|---|---|---|
| a | (true, true) | artichoke | [a, b) | {(@1, apple)} |
| b | (false, true) | — | [b, c) | {(@7, kiwi), (@1, apple)} |
| b@2 | (true, true) | beet | [b, c) | {(@7, kiwi), (@1, apple)} |
| c | (false, true) | — | [c, e) | {(@7, kiwi), (@3, banana), (@1, apple)} |
| e | (false, true) | — | [e, k) | {(@7, kiwi), (@5, orange), (@1, apple)} |
| k | (false, true) | — | [k, m) | {(@5, orange), (@1, apple)} |
| m | (false, true) | — | [m, z) | {(@1, apple)} |
| t@3 | (true, true) | turnip | [m, z) | {(@1, apple)} |

In some embodiments, as shown in Table 3, the combined iterator observes iterator positions at keys a, b, b@2, c, e, k, m, and t@3 that each correspond to respective values returned by the HasPointAndRange( ), Value( ), RangeBounds( ), and RangeKeys( ) accessors. With respect to FIG. 8 and Table 3, when the combined iterator is positioned at a point key (e.g., such that Key( )=a, b@2, or t@3), the iterator can surface both the point key's value using Value( ) accessor and the value(s) of overlapping range key(s) using the RangeKeys( ) accessor. In some cases, one or more range keys can cover (e.g., correspond to) a particular key (e.g., surfaced by the Key( ) accessor), where each range key can include a different suffix. One or more range keys covering a key (e.g., surfaced by the Key( ) accessor) may not include the same suffix. One or more range keys with the same suffix may not cover a key based on the most-recently committed range key (e.g., the range key corresponding to a highest sequence number as described herein) superseding earlier committed range keys. In some cases, an iterator may be configured to iterate with selected lower and/or upper boundaries. If the iterator has selected lower and/or upper bounds, the iterator will truncate surfaced range keys to the selected boundaries. For example, for keys ordered alphabetically from key "a" to key "z", if an iterator had an upper boundary of key "y", the iterator would surface the boundaries defined as [m,y) for a range key corresponding to the boundaries defined as [m,z).

In some embodiments, a range key may provide "masking", which may be an additional, optional functionality for a use case of implementing an MVCC-compatible delete range operation. In some cases, when configuring a combined iterator that iterates over both point and range keys, a user may provide a selection indicating that range keys mask (e.g., hide or skip) point keys during iteration. Masking may be configured with a selected suffix parameter that determines which range keys can mask point keys. In some cases, only range keys with suffixes that sort after a selected suffix parameter may mask point keys. A range key may that adheres to this condition only masks points with suffixes that sort after the range key's suffix.

In some embodiments, masking may be configured using an Iteration Options parameter referred to as "IterOptions". The IterOptions parameter may be defined as described in Table 4.

TABLE 4

```
type IterOptions struct {
    // ...
    RangeKeyMasking
}
```

In some embodiments, as shown in Table 4, the IterOptions parameter may include a RangeKeyMasking parameter. The RangeKeyMasking parameter may be used to configure automatic hiding of point keys using range keys. A non-null suffix selected for RangeKeyMasking parameter may enable range-key masking as described. If the RangeKeyMasking parameter does not include a selected non-null suffix, range key masking may be disabled. If range key masking is enabled (e.g., via a non-null suffix selected for the RangeKeyMasking parameter), range keys including suffixes that are greater than or equal to the non-null suffix selected for the RangeKeyMasking parameter may function as masks. Point keys in a key space may be skipped (e.g., not observed) if the point key: (i) is included within the boundaries of a masking range key; and (ii) has a suffix greater than the range key's suffix. For a point key to be masked by a range key, for a RangeKeyMasking suffix "s", a range key suffix "r", and point key suffix "p", the equation defined as s≥r>p must be satisfied for the comparison of the suffixes "s", "r", and "p". For a comparison between suffixes, suffixes including newer, more recent timestamps and/or versions may be larger (e.g., greater than) suffixes including older, less recent timestamps and/or versions. In some cases, range key masking may only be used when iterating over both range keys and point keys using a combined iterator.

In some embodiments, as described herein, masking may be configured using a non-null suffix for the RangeKeyMasking parameter. The RangeKeyMasking parameter may be defined as described in Table 5.

TABLE 5

```
type RangeKeyMasking struct {
    Suffix [ ]byte
    Filter func( ) BlockPropertyFilterMask
}
```

In some embodiments, as shown in Table 5, the RangeKeyMasking parameter may be configured using a selected "Suffix" parameter and "Filter" field. The Suffix parameter configures which range keys may mask point keys as described herein, where the Suffix parameter can be selected by a user (e.g., during configuration of an iterator). A Suffix may be selected by a user via a RangeKeyMasking.Suffix operation. As described herein, only range keys that are defined for suffixes less than or equal to the Suffix of the RangeKeyMasking parameter will mask point keys. The Filter field may be an optional field that may be used to improve performance of range-key masking through a block-property filter defined over key suffixes. If the Filter field is selected to be non-null, Filter is called by the storage engine to construct a block-property filter mask at a time of iterator creation. The filter is used to skip whole point-key data blocks that include point keys with suffixes less than a suffix of a covering range key (e.g., a range key that covers the point keys).

In some embodiments, to use the Filter field and corresponding block property functionality, a user must create and configure a block property collector (e.g., using an Options.BlockPropertyCollectors command) that records the maximum suffix contained within a block (e.g., an index and/or data block). The user may be required to write and provide a BlockPropertyFilterMask implementation on such a block property. Additional features of block property collectors and filters are described herein (e.g., with respect to FIGS. 11A, 11B, 12A, and 12B). In some embodiments, block property collectors may be configured to collect properties corresponding to range keys.

In some embodiments, a user may construct an iterator including a selected suffix for a RangeKeyMasking parameter. As an example, a user may select a suffix of the RangeKeyMasking parameter to be @50. During iteration using the iterator, a range key defined as [a,c) with a suffix of "@60" (e.g., such that the full range key is defined as [a,c)@60) may not mask any point keys based on the suffix of the RangeKeyMasking parameter being less than the suffix of the range key (e.g., @50<@60). As another example, during iteration using the iterator, a range key defined as [a,c) with a suffix of "@30" (e.g., such that the full range key is defined as [a,c)@30) may mask point keys defined as "a@20" and "Apple® 10" and may not mask a point key defined as "Apple® 40". In some cases, a range key can only mask point keys that include MVCC timestamps (or versions) older than the timestamp (or version) of the range key. Only range keys with suffixes (e.g., MVCC timestamps or versions) may mask point keys.

In some embodiments, a combined iterator can surface all range keys when masking is enabled. The combined iterator may only skip point keys when masking is enabled. As described herein, a combined iterator may only skip point keys when the point keys are included within the boundaries of a range key that has a more-recent suffix, and the suffix of the range key is older than the timestamp corresponding to the suffix of the RangeKeyMasking parameter (e.g., corresponding to RangeKeyMasking.Suffix).

Implementation of Range Keys

In some embodiments, an implementation of range keys introduces additional write operations, including RangeKeySet, RangeKeyUnset, and RangeKeyDelete operations. These operations may be represented as internal keys with corresponding key kinds (e.g., each indicative of a kind of a key) encoded as a part of a key trailer encoded for an sstable. Range keys can be stored within range key blocks that are separate from index and/or data blocks corresponding to point keys. Range keys and point keys may be included in a same sstable. The range key blocks may store RangeKeySet, RangeKeyUnset, and RangeKeyDelete keys and may not store keys of any other kind. Within memtables corresponding to sstables, range keys may be stored in a separate skip list.

In some embodiments, a RangeKeySet([k1,k2), @suffix, value) operation for keys "k1" and "k2" may be encoded in a range key block as a k1.RANGEKEYSET key with a value encoding the tuple (k2,@suffix,value). A RangeKeyUnset ([k1,k2), @suffix) operation for keys "k1" and "k2" may be is encoded as a k1.RANGEUNSET key with a value encoding the tuple (k2,@suffix). A RangeKeyDelete([k1,k2) operation for keys "k1" and "k2" may be encoded as a k1.RANGEKEYDELETE key with a value encoding k2.

In some embodiments, range keys may be physically fragmented as an artifact of LSM tree structure and internal sstable boundaries. Such fragmentation may be used to maintain performance characteristics of an LSM tree. The public interface operations for RangeKeySet and RangeKeyUnset require both boundary keys [k1,k2) to include only prefixes (e.g., to not include a suffix). Internal to the storage engine, these keys may be fragmented to boundaries including prefixes and suffixes. If a user attempts to write a RangeKeySet([a@v1, c@v2), @v3, value) operation via a client device, the storage engine may send an indication of an error to the user at the client device. If a user writes a RangeKeySet([a, c), @v3, value) operation via a client device, the storage engine may allow write to execute and may later internally fragment the RangeKeySet operation into three internal keys as: (i) RangeKeySet([a, a@v1), @v3, value); (ii) RangeKeySet([a@v1, c@v2), @v3, value); and (iii) RangeKeySet([c@v2, c), @v3, value). Such fragmentation can maintain LSM tree performance characteristics by allowing a range key to be split across one or more (e.g., many) sstables, and maintain locality between range keys and point keys. As an example, a RangeKeySet ([a,z), @1, foo) operation execute on a key space (e.g., database) that includes millions of point keys in the range [a,z) that is alphabetically ordered from key "a" to "key "z". If the [a,z) range key was not permitted to be fragmented internally, the range key would need to be stored completely separately from the point keys in a separate sstable or in a single intractably large sstable containing all of the overlapping point keys. Fragmentation enables locality and allows for point keys and range keys located in the same region of the key space to be stored in the same sstable.

In some embodiments, similar to other keys of the key space, keys corresponding to RangeKeySet, RangeKeyUnset, and/or RangeKeyDelete operations can be assigned sequence numbers (e.g., similar to other internal keys). A sequence number for an operation may be referred to as "#number", where "number" is any suitable sequence identifier (e.g., a positive integer). Sequence numbers may be used by the storage engine to determine which keys appear live to which iterators. When an iterator is constructed, the iterator determines a current visible sequence number. For the lifetime of the constructed iterator, the iterator may only surface keys that have a sequence number less than the current visible sequence number previously determined by the iterator.

In some embodiments, LSM tree level invariants (e.g., properties) may be valid across range keys, point keys, and between both range keys and point keys. For a first of an LSM tree level invariants, for point key prefixes k1 and k2 and suffixes s1 and s2 (e.g., timestamps or versions), a point key "k1 #s2" may not be at a lower level than a point key "k2 #s1", where k1=k2 and s1<s2. Such a first LSM tree level invariant may be implemented by all LSM trees. For a second of an LSM tree level invariants, for point key prefixes k1, k2, k3, and k4 and suffixes s1 and s2 (e.g., timestamps or versions), a range key corresponding to a RangeKeySet([k1,k2)) #s2 operation may not be at a lower level than a range key corresponding to a RangeKeySet([k3, k4)) #s1 operation, where [k1,k2) overlaps [k3,k4) and s1<s2. For a third of an LSM tree level invariants, for point key prefixes k1, k2, and k3 and suffixes s1 and s2 (e.g., timestamps or versions), a range key corresponding to a RangeKeySet([k1,k2)) #s2 operation may not be at a lower level than a point key k3 #s1, where k3 is included in in [k1,k2) and s1<s2. In some cases, one or more of the LSM tree level invariants described herein may not be valid across range keys, point keys, and between both range keys and point keys.

In some embodiments, range keys corresponding to RangeKeyUnset and RangeKeyDelete operations may be elided (e.g., deleted or removed) when the range keys drop to the bottom most level (e.g., level L6) of the LSM tree and when there is no snapshot preventing deletion of the range keys.

In some cases, a snapshot may determine the current visible sequence number, store the current visible sequence number, generate an indication requesting that compactions preserve historical operations corresponding to the current visible sequence number. A space (e.g., interval) between sequence numbers determined in snapshots may be referred to as a "snapshot stripe".

In some embodiments, as described herein, range keys corresponding to RangeKeySet, RangeKeyUnset and RangeKeyDelete operations may be keyed by their respective start key. In some cases, all keys within an ingested sstable may adopt a same sequence number. Based on all keys within an ingested sstable adopting a same sequence number, multiple range keys must be supported at the same sequence number. In some cases, duplicate internal keys (e.g., keys with equal prefixes, sequence numbers, and kinds) may be prohibited for the storage engine described herein, based on duplicate internal keys being prohibited within the storage engine, fragments with the same boundaries may be merged within snapshot stripes into a single physical KV pair, which may representing multiple logical KV pairs. As an example, a range key of k1.RangeKeySet #s2 may be mapped to a value of (k2,[(@t2,v2),(@t1,v1)]) to form a KV pair. In some cases, within a physical KV pair, suffix-value pairs may be stored and sorted by suffix in descending order (e.g., newest to oldest or highest to lowest). Such a storage technique can reduce iteration-time key prefix comparisons when multiple range keys are included in a table.

In some embodiments, the keys corresponding to RangeKeySet and RangeKeyUnset operations can have values that encode fields of data known to the storage engine. A value selected by a user in a call to a RangeKeySet operation may be unknown to the storage engine and the physical representation of the value of the RangeKeySet operation may be known to the storage engine. A value mapped to a range key of a RangeKeySet operation may be encoded as:

an end key of a "varstring" type that encodes the end boundary of the interval of the fragment; and a series of (suffix, value) tuples representing logical range keys that were merged into single physical key corresponding to a RangeKeySet operation, where a Suffix is a "varstring" type and a Value is a "varstring" type.

In some cases, keys corresponding to a RangeKeyUnset operation may be merged within snapshot stripes and can have a physical representation of a key of k1.RangeKeyUnset #s2 mapped to a value of (k2,[(@t2), (@t1)]). A value mapped to a range key of a RangeKeyUnset operation may be encoded as:

an end key of a "varstring" type that encodes the end boundary of the interval of the fragment; and a series of suffixes of a "varstring" type.

In some embodiments, if key fragments with identical boundaries corresponding to RangeKeySet and RangeKeyUnset operations meet within a same snapshot stripe of a compaction, any suffixes corresponding to the RangeKeyUnset operation that are equivalent to suffixes corresponding to the RangeKeySet operation key may be removed. In some cases, a range key corresponding to a RangeKeyDelete operation only includes a start boundary and a value mapped to the range key includes an end boundary, where the start and end boundaries correspond to the key span indicated by the RangeKeyDelete operation. In some cases, range keys corresponding to RangeKeySet and RangeKeyUnset operations may not be merged within batches or a memtable. Batches may be append-only and indexed batches can refragment and merge range keys as needed (e.g., on-demand). In a memtable, each key includes and/or otherwise corresponds to a unique sequence number.

In some embodiments, keys for RangeKey Set, RangeKeyUnset, and RangeKeyDelete operations may be assigned sequence numbers when committed. As described above, overlapping keys for RangeKeySet and RangeKeyUnset operations may be fragmented to have matching start and end boundaries. The resulting exactly-overlapping range key fragments may be merged into a single internal KV pair within the same snapshot stripe and sstable. The original, unmerged internal keys can each have respective sequence numbers that are indicative of the time at which they were committed within a history of all write operations.

Sequence numbers as described herein may be used by the storage engine to determine the keys that appear as live (e.g., readable) to iterators iterating over the key space. When an iterator is constructed, the iterator determines a current visible sequence number. For the lifetime of the constructed iterator, the iterator only surfaces keys that have a sequence number less than the current visible sequence number determined previously. In some cases, a snapshot may determine the current visible sequence number, store the current visible sequence number, generate an indication requesting that compactions preserve historical operations corresponding to the current visible sequence number. A space (e.g., interval) between sequence numbers determined in snapshots may be referred to as a "snapshot stripe". If operations and keys are included in the same snapshot stripe, the operations may drop or otherwise mutate the keys. If operations and keys are not included in the same snapshot stripe, the operations may not drop or otherwise mutate the keys. For example, a k.MERGE #5 key (e.g., corresponding to a sequence number #5) may not be merged with a k.MERGE #1 key (e.g., corresponding to a sequence number #1) if there's an open snapshot at sequence number #3.

In some embodiments, range keys corresponding to the RangeKeySet, RangeKeyUnset, and RangeKeyDelete operations may behave similarly to point keys with respect to sequence numbers. In some cases, overlapping range keys may not be merged if an open snapshot separates the overlapping range keys. As an example, a range key may be written at sequence number #1 for boundaries defined as [a,z) for key "a" to key "z" ordered alphabetically and a point key d. SET #2 may have a sequence number #2. A combined iterator using a sequence number #3 and positioned at key d may surface both the range key [a,z) and the point key d.

In some embodiments, the suffix-based masking of range keys may operate irrespective of sequence numbers corresponding to keys. As an example, a range key [a,z)@10 for key "a" to key "z" ordered alphabetically may be committed as a sequence number #1. At a sequence number #2, a point key d@5 may be committed. A combined iterator that is configured with a RangeKeyMasking parameter with a suffix of @20 may mask the point key d@5 based on the suffixes corresponding to the point key d@5 and the range key [a,z)@10.

In some embodiments, range keys may follow a similar relationship to sstable boundaries as existing range delete (e.g., referred to as "RANGEDEL") tombstones. The boundaries of a range key may be prefixes (e.g., user keys) of point keys. Each range key may be limited by the boundaries of its containing sstable (e.g., the sstable that contains the range key). As an example, point keys may be a #50, b #70, b #49, b #48, c #47, d #46, e #45, and f #44 and a range key may be [a,e) #60. Previously, based on the multiple versions of the key b, the storage engine may split output sstables during a compaction (e.g., based on sstable size and/or sstable overlap between LSM tree levels), such that the different versions of the key b would span more than one sstable. Such a technique can cause problems for range delete operations that span the more than one sstable. Accordingly, the storage engine may not allow for such sstable split points. Based on the above-described example, by postponing the sstable split point to the key c, the range key may be split into range keys [a,c) #60 and [c,e) #60. The sstable end boundary (e.g., inclusive boundary) for a first sstable corresponding to the range key [a,c) #60 may be at key c #inf, where inf is the largest possible sequence number. The sstable start boundary for the second sstable corresponding to the range key [c,e) #60 may be at key c #60.

As an example for keys including suffixes, a first sstable may correspond to points keys a@100, a@30, b@100, b@40 and a range key [a,c)@50. A second sstable may include point keys b@30, c@40, d@40, e@30 and a range key [c,e)@50. The first and second sstables may be split in between the key b@40 and the key b@30. When a compaction operation determines to defer the key b@30 to the next (e.g., second) sstable and complete the first sstable, the range key [a,c)@50 may be included in a fragmenter. The compaction operation may be required to split the range key at the boundaries determined by the prefix b of the deferred key b@30. The compaction operation may use the first point key of b@30 of the next (e.g., second) sstable to truncate the range key [a,c)@50 to the truncated range key [a,b@30) @50. The compaction operation may flush the fragment [a,b@30)@50 to the first sstable and may update the existing fragment to begin at the key b@30. If a range key extends into a next (e.g., second) sstable file, the range key's truncated end boundary is used to determine the end boundary of the first sstable. The end boundary of the first sstable may become b@30 #inf, thereby indicating that the range key corresponding to the first sstable does not cover the key b@30. The start boundary of the second sstable may be b@30.

Iterator Merging Operations

In some embodiments, as described herein, range keys can be split based on boundaries corresponding to sstables in an LSM tree. Users of an LSM tree storage system (e.g., the computing system 100) typically expect that different LSM trees that have different sstable settings and receive the same write operations should output the same KV pairs during iteration. Accordingly, the iterators described herein may be configured to defragment range keys during iteration. As an example of defragmentation, a range key "[k1,k2)@suffix1" mapped to a value "value1" and a range key "[k2,k3) @suffix2" mapped to a value "value2" may be defragmented (e.g., combined and/or merged) if suffix1 is equivalent to suffix2 and value1 is equivalent to value2, such that the prefix of the combined range key is [k1,k3). Such defragmentation during iteration may not be based on (e.g., use) sequence numbers corresponding to range keys. Sequence numbers may not be used for defragmentation if an LSM state can be exported to another LSM tree by sstable ingestion. Sstable ingestion may enable the storage engine to receive a user-defined sstable and link the sstable to the LSM tree without use of a WAL and a memtable. Sstable ingestion may collapse different sequence numbers to a same sequence number.

In some embodiments, defragmentation can require stepping ahead from current iterator position to defragment range keys. Such stepping ahead can cause switching from a first sstable to a second sstable while there are remaining points to be consumed in the first sstable. In some cases, an iterator stack may refer to a number of ordered, layered iterators that each correspond to a respective level of an LSM tree. To provide determinism, the storage engine may construct a range key iterator stack. The range key iterator stack may be separate from a point iterator stack including during combined iteration over both range and point keys. The separate range key iterator may iterate and move independently of a point key iterator. Combined iteration may require use of both a range key iterator and point key iterator. Separation of the range key and point key iterators may enable the range key iterator to independently access adjacent sstables to defragment included range keys (if necessary) without repositioning the point iterator.

In some embodiments, with respect to defragmentation for keys "k1", "k2", "k3", and "k4", respective range keys defined as [k1,k2) and [k3,k4) may be defragmented if their boundaries abut and their user observable-state is identical. The boundaries of the range keys may abut if k2 is equivalent to k3. The user observable state may be identical if each key span includes the same set of range key (<suffix>, <value>) pairs. As an example, for a first range key with boundaries [a,b) and values [("@5", "foo"), ("@3", "bar")] and a second range key with boundaries [b,c) and values [("@5", "foo"), ("@3", "bar")], then the user-observable state is identical for the two key spans, and the first and second range keys may be merged to form a combined range key with the bounds [a,c) and values [("@5", "foo"), ("@3", "bar")]. To support RangeKeyUnset and RangeKeyDelete operations, defragmentation operations may be required to be applied after resolving the RangeKeyUnset and RangeKeyDelete operations.

In some embodiments, as described herein, range key(s) and point key(s) can be stored in a same sstable. In an LSM tree, sstables can be distributed across levels (e.g., levels L0-L6). Within a particular level, sstables may not overlap. Between different levels, sstables may overlap arbitrarily. During iteration using an iterator, keys across different levels must be merged together. For point keys, a heap may be used to merge the point keys together. For range keys, a range key merging iterator may be used to merge range keys across different levels. Merging range keys across levels may include applying fragmentation at intersection boundaries of the range keys. In some cases, a merging iterator may be initialized with one or more (e.g., arbitrary number) child iterators over fragmented key spans. Each child iterator may expose fragmented range keys, such that overlapping range keys are surfaced in a single key span corresponding to a single set of boundaries. Range keys corresponding a first child iterator may arbitrarily overlap key spans corresponding to a second child iterator. Each child iterator may correspond to a respective level of the LSM tree.

In some embodiments, a merging iterator can execute one or more operations. The one or more operations can include (i) initializing a heap, where the heap includes boundary keys of range keys corresponding to child iterator(s) of the merging iterator. The one or more operations can include (ii) determining, from the boundary keys of the heap, the next two unique key prefixes (e.g., during forward iteration) or the previous two unique key prefixes (e.g., during reverse iteration). The one or more operations can include (iii) determining a key span (e.g., interval) formed between the determined unique key prefixes to be a candidate key span. The one or more operations can include (iv) determining whether any key spans of range key(s) corresponding to each of the child iterator(s) overlap the candidate key span. If a key span overlaps with the candidate key span, the merging iterator can accumulate keys corresponding to the key span and can return the range key fragment corresponding to the key span. If no key spans overlap with the candidate key span, the merging iterator may drop the smallest (e.g., for forward iteration) or largest (e.g., for reverse iteration) unique key prefix and may advance the iterators to the next unique boundary key. The merging iterator may then return to step (iii) described above to determine a new candidate key span.

Figure 9:
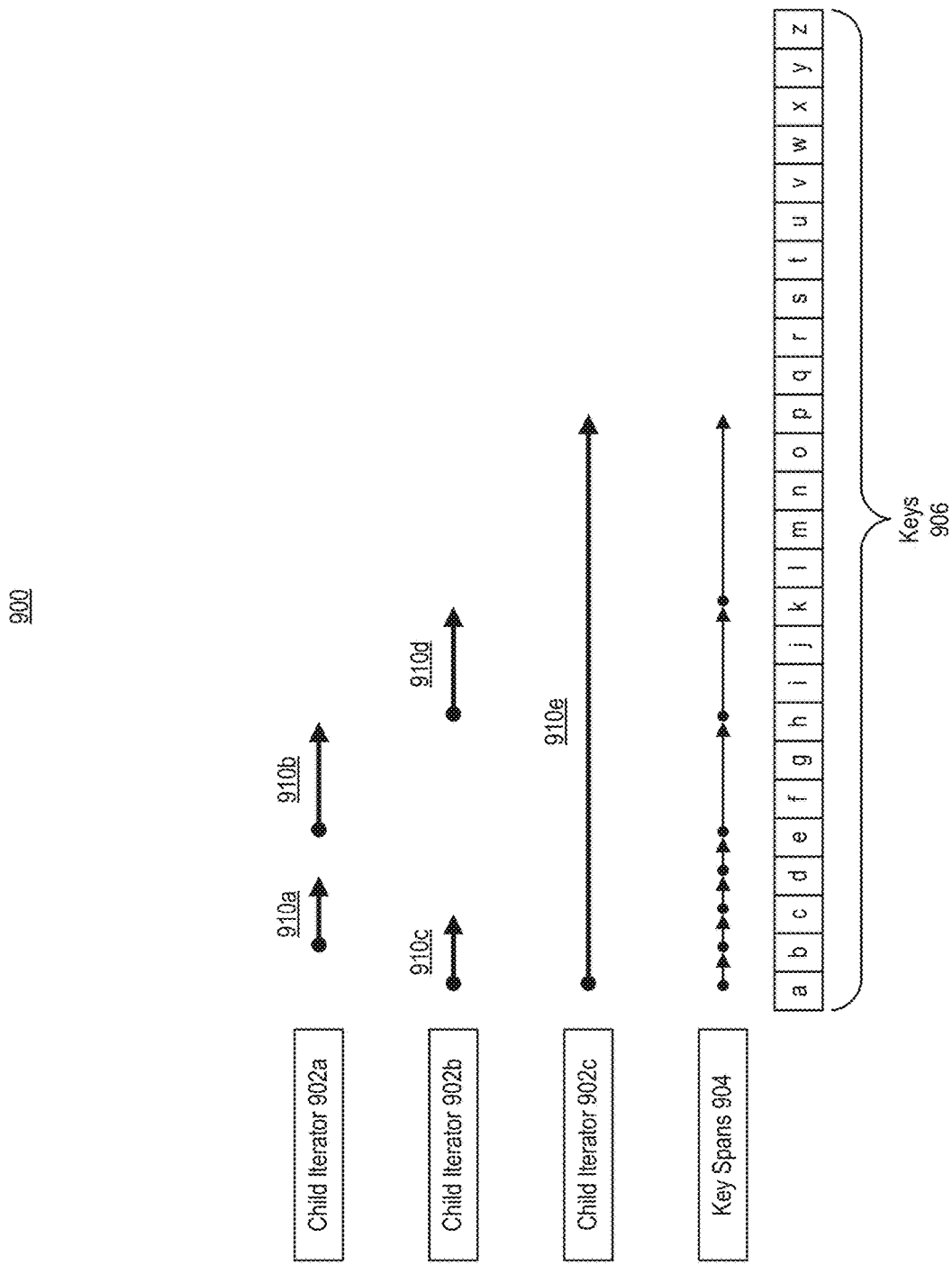
FIG. 9 shows an exemplary illustration of key fragmentation for child iterators of a merging iterator, according to some embodiments.

FIG. 9 shows an exemplary illustration 900 of key fragmentation for child iterators 902 of a merging iterator, according to some embodiments. Key fragmentation associated with keys 906 may correspond to alphabetically ordered key "a" to key "z", where a<z. As shown in FIG. 9, a child iterator 902a may correspond to range key fragments 910a and 910b with key spans of [b,d) and [e,h), respectively. A child iterator 902b may correspond to range key fragments 910c and 910d with key spans of [a,c) and [h,k), respectively. A child iterator 902c may correspond to a range key fragment 910e with a key span of [a,p). Accordingly, the merging iterator many iterate through each key span between unique boundaries of the keys 906 corresponding to the range key fragments 910, which may be referred to as key spans 904. The key spans 904 as shown in FIG. 9 can include [a,b), [b,c), [c,d), [d,e), [e, h), [h, k), and [k, p).

In some embodiments, a merging iterator initializes a heap to prepare for iteration, where the heap includes boundary keys of range keys corresponding to child iterator(s) of the merging iterator. While forward iteration for a merging iterator after a call to first (e.g., a position at a first, initial key in key span) is described herein, reverse iteration and other positioning methods may include similar features to those described herein. To initialize the heap, each child iterator 902 determines a start boundary of a first range key fragment 910 corresponding to the respective child iterator. With respect to FIG. 9, the child iterator 902a may determine (b, boundKindStart, [[b,d)]), where boundKindStart indicates key b as the start boundary based on the range key fragment 910a corresponding to [b,d). The child iterator 902b may determine (a, boundKindStart, [[a,c)]), where boundKindStart indicates key a as the start boundary based on the range key fragment 910c corresponding to [a,c). The child iterator 902c may determine (a, boundKindStart, [[a,p)]), where boundKindStart indicates key a as the start boundary based on the range key fragment 910e corresponding to [a,p).

In some embodiments, based on each of the child iterators 902 determining a start boundary for their respective first range key fragment 910, the merging iterator determines a root of the heap based on the smallest of the determined start boundaries. With respect to FIG. 9, the merging iterator may determine the root of the heap to be key a. For forward iteration, the root of the heap may be the start key of a next merged key span. The merging iterator may determine and store the root as the start key. In some cases, the heap may contain other levels with range keys that have a same key prefix as a boundary of a range key. Accordingly, the merging iterator may search the heap to determine a next boundary greater than the stored start key. To search the heap to determine a next boundary greater than the stored start key, the merging iterator may cause each child iterator 902 to advance to the next boundary greater than the stored start key. With respect to FIG. 9, the child iterator 902a may determine (b, boundKindStart, [[b,d)]), where boundKindStart indicates key b as the start boundary based on the range key fragment 910a corresponding to [b,d). The child iterator 902b may determine (c, boundKindEnd, [[a,c)]), where boundKindEnd indicates key c as the end boundary based on the range key fragment 910c corresponding to [a,c). The child iterator 902c may determine (p, boundKindEnd, [[a, p)]), where boundKindEnd indicates key p as the end boundary based on the range key fragment 910e corresponding to [a,p). Based on the determined boundaries of keys b, c, and p from the child iterators 902a, 902b, and 902c, respectively, the merging iterator may determine a smallest of the determined boundaries to be key b. The merging iterator may determine the smallest of the determined boundaries to be the end key of the next merged key span (also referred to as the candidate key span). The merging iterator may determine a next merged key span based on the determined start key and end key, thereby resulting in a determined candidate key span of [a,b).

In some embodiments, based on determining the candidate key span, the merging iterator must determine which, if any, of the range key fragments 910a corresponding to child iterators 902 overlap with the candidate key span. During forward iteration, any child iterator 902 (e.g., child iterators 902b and 902c) that is positioned at an end boundary has an overlapping key span with the candidate key span. A key span may overlap with the candidate key span based on a respective child iterator 902's current position at an end boundary being greater than or equal to the end boundary included in the candidate key span. The start boundary corresponding to the child iterator 902's range key fragments(s) must be less than or equal to the starting boundary included in the candidate key span since there can be no other key prefixes between the boundaries of the candidate key span.

In some embodiments, the merging iterator iterates over the levels each corresponding to a child iterator 902 and collects keys from any child iterators 902 that are positioned at end boundaries. With respect to FIG. 9, child iterators 902b and 902c are positioned at end boundaries for the candidate key span [a,b) and the merging iterator may collect the key spans of [a,c) and [a,p) corresponding to the child iterators 902b and 902c. Such key spans include and/or overlap with the candidate key span and can extend beyond the candidate key span. The merging iterator may return the keys corresponding to the overlapping key span(s) and the new start and end boundaries of the candidate key span, while preserving the underlying keys' sequence numbers, key kinds (e.g., an enum type for a RangeKey Set, RangeKeyUnset, or RangeKeyDelete operation), and values.

In some embodiments, the merging iterator may not determine that keys from any child iterators 902 are positioned at end boundaries, such that the merging iterator does not determine that any range key fragments 910 overlap with the candidate key span. Based on determining that no range key fragments 910 overlap with the candidate key span, the merging iterator may determine a new candidate key span for a next boundary greater than the previously stored end key. The merging iterator may repeat the above steps to determine a candidate key span that includes one or more range key fragments.

In some embodiments, as described with respect to the range keys 810 and keys 806 of FIG. 8, a combined iterator configured to surface both point and range keys can iterate to the positions described in Table 3 during forward iteration. To implement an MVCC soft delete operation using range keys, the range key [b,k)@7 mapped to the value kiwi may represent that all point keys within the range defined as [b,k) are deleted at an MVCC timestamp referred to as @7. Accordingly, a user may be required to provide a selection so that "soft deleted" point keys are not observed and an iterator skips the soft deleted point keys. As described herein for an MVCC system, whether a point key is soft deleted (e.g., and consequently observed or skipped) is based (e.g., dependent) on a timestamp at which the database is read (e.g., by a read transaction corresponding to a timestamp) and/or otherwise queried.

In some embodiments, for range key masking as described herein, a range key may function as a mask by hiding point keys with MVCC timestamps less than an MVCC timestamp corresponding to the range key. A user (e.g., via a client device 106) may configure the iterator with an MVCC timestamp suffix that indicates a timestamp at which KV data (e.g., historical KV data) should be read. In some cases, range keys including suffixes (e.g., MVCC timestamps) that are less than or equal to the configured suffix for the iterator may function as masks. Point keys including suffixes (e.g., MVCC timestamps) that are less than a covering, masking range key's suffix may be hidden and skipped by an iterator, such that the point keys and the respective values corresponding to the point keys are not observed.

In some embodiments, for a query directed to a masked point key, the iterator may not observe the value corresponding to the skipped point key and the iterator may not return the value (e.g., to a client device) in response to the query. In some cases, the iterator may return no value(s) and/or empty value(s) to the client device in response to the query. The iterator may the iterator may return no value(s) and/or empty value(s) to the client device in response to the query if the iterator did not read any values (e.g., based on masking). For example, for a query directed to a point key that is masked by a range key, the iterator may skip reading a value of the point key and may cause an empty value and/or an empty row to be sent to the client device in response to the query.

As described herein, for a range key to mask a point key, for a RangeKeyMasking suffix "s", a range key suffix "r", and point key suffix "p", the equation defined as $s \geq r > p$ must be satisfied. In the above example with respect to FIG. 8 and Table 3, if the RangeKeyMasking suffix is selected as @7, every range key 810 may function as a mask and the point key b@2 may be hidden during iteration based on being included in the key span corresponding to the range key 810d of [b,k)@7. The point key t@3 may not be masked by a range key 810 based on its suffix of @3 being greater (e.g., more recent) than the suffix of @1 included in the overlapping range key 810a of [a,z)@1. If the RangeKeyMasking suffix is selected as @6 (e.g., for a historical, point-in-time read), the range key 810d of [b,k)@7 range key may not function as a mask and the point key b@2 may be visible to an iterator.

In some embodiments, LSM invariants described herein may not be relied on to efficiently implement masking. As an example, LSM invariants may not be relied on due to a point key b@100 being at a lower LSM tree level than a range key [a,e)@50. In some cases, block property filters that use an MVCC timestamp block property may be used in order to skip blocks (e.g., data and/or index block) that wholly include point keys that are masked by a range key. A user (e.g., via a client device 106) may configure a block-property collector to record the highest (e.g., most recent) MVCC timestamps of point keys within blocks.

In some embodiments, during read time and when positioned within a range key with a suffix less than or equal to a suffix of the RangeKeyMasking parameter, the iterator can configures sstable readers to use a block-property filter to skip any blocks for which the highest MVCC timestamp is less than the provided suffix of the range key. These iterators must identify boundaries corresponding to index blocks to ensure the block-property filter is not applied beyond the boundaries of the masking range key.

Block Property Collection

In some embodiments, a user of an LSM tree storage system (e.g., corresponding to the cluster 102) can configure one or more block property collectors (e.g., via a client device 106). Each block property collector may be identified by a unique string name. A unique string name for each block property collector corresponding to an sstable may be recorded and/or otherwise indicated in a table properties block of the sstable. The unique string name corresponding to each block property collector can be used by a block property filter to query a data block when a query is issued (e.g., by a user via a client device). An example block property collector may be an MVCC-time-interval collector that collects MVCC timestamps from the KV pairs within a block and has "MVCC-time-interval" as a unique string name. Another example block property collector may be an integer-value-interval collector that collects the minimum and maximum values (e.g., interpreted as integers) from the KV pairs within a block and has "integer-value-interval" as a unique string name. Each unique string name for a block property collector may be mapped to a unique integer (e.g., 8-bit integer) as described herein.

Figure 10:
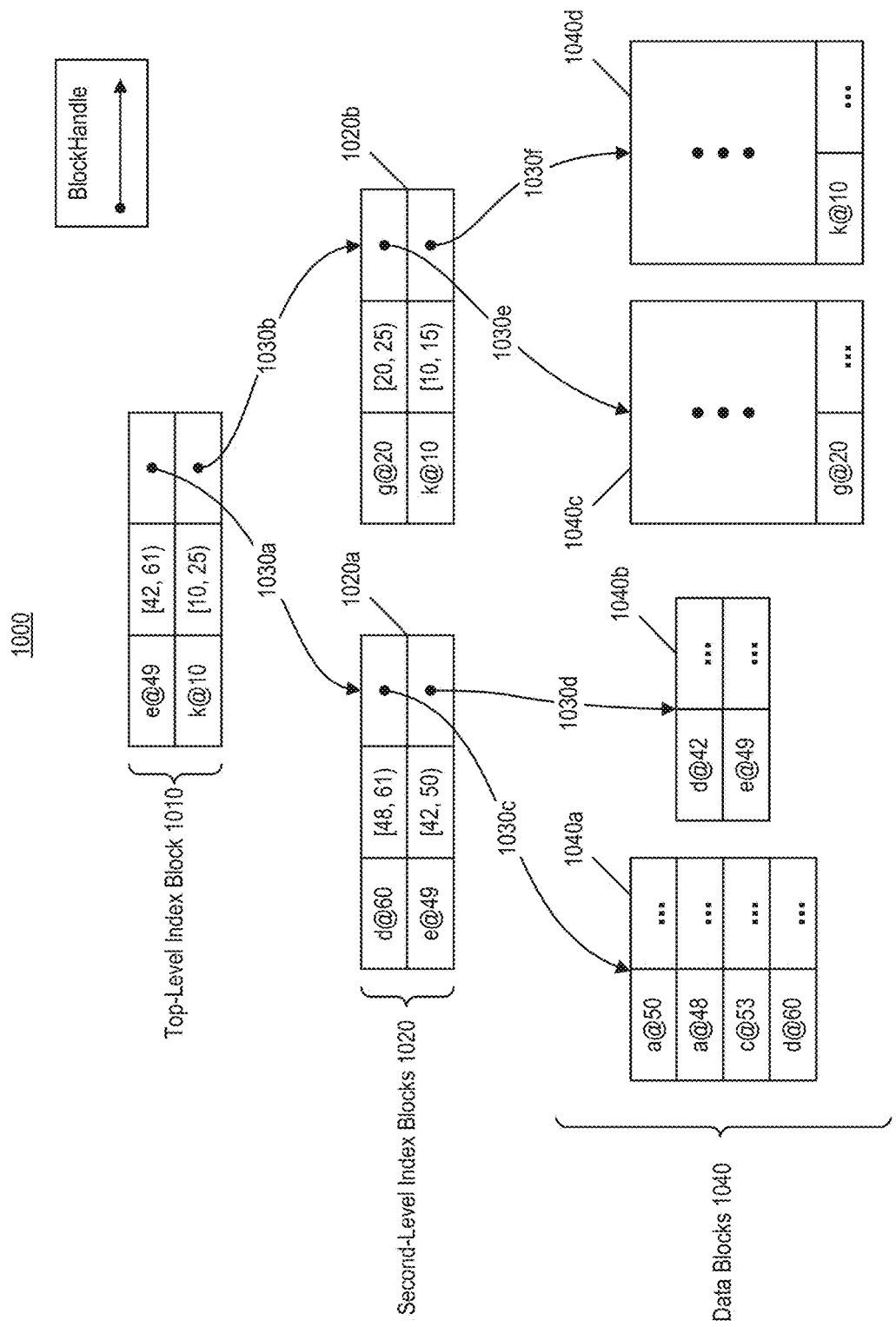
FIG. 10 shows an exemplary illustration of an sstable, according to some embodiments.

In some embodiments, a block property collector may be a function and/or an operator that can be used to derive and/or encode (e.g., concisely encode) an attribute or a set of attributes in a set of KV pairs of an sstable. Attributes may be based on values of KV pairs of an sstable and/or other features (e.g., timestamps) corresponding to KV pairs of an sstable. For example, for the exemplary MVCC-time-interval collector described herein, the encoded attribute is an MVCC timestamp interval, where the encoding is the [minimum-time, maximum-time) interval computed from the timestamps of the set of KV pairs included in a data block and/or a second-level index block. FIG. 10 shows an exemplary sstable 1000 including encoded attributes (e.g., MVCC timestamp intervals) in a set of KV pairs. Referring to FIG. 10, the sstable 1000 includes a top-level index block 1010, one or more second level index blocks 1020, and one or more data blocks 1040. The top-level index block 1010 includes a key per second-level index block 1020 of the sstable 1000. In some cases, keys in an sstable (e.g., sstable 1000) may be represented by one or more attributes. For example, as shown in FIG. 10, keys may be a two-attribute key including a string and a version (e.g., represented as "string@version"), which may be common in multi-versioning systems (e.g., MVCC databases). As shown in FIG. 10, the top-level index block 310 includes keys e@49 (e.g., key "e" at version 49) and k@10 (e.g., key "k" at version 10) that map to BlockHandles 1030a and 1030b, respectively. The BlockHandle 1030a encodes the location of the second-level index block 1020a within the sstable 1000. The BlockHandle 1030b encodes the location of the second-level index block 1020b within the sstable 1000. The second-level index blocks 1020 include a key per data block 1040. As shown in FIG. 10, the second-level index block 1020a includes keys d@60 and e@49 that map to BlockHandles 1030c and 1030d, respectively, and the second-level index block 1020b includes keys g@20 and k@10 that map to BlockHandles 1030c and 1030d, respectively.

Each of the data blocks 1040 can include one or more KV pairs. In some cases, keys in each data block 1040 may be sorted (e.g., numerically, alphabetically, chronologically, etc.). For example, for data block 1040a, keys may be sorted from alphabetically based on the string attribute of the key from a@50 to d@60. As shown in FIG. 10, the data block 1040a includes keys a@50 to d@60, which are mapped to any suitable respective values. The data block 1040b includes key d@42 and e@49, which are mapped to any suitable respective values. The data block 1040c includes one or more KV pairs, including at least key g@20 which is mapped to any suitable respective value. The data block 1040d includes one or more KV pairs, including at least key k@10, which is mapped to any suitable respective value. While the sstable 1000 is shown as including the top-level index block 1010, the second-level index blocks 1020a and 1020, and the data blocks 1040a, 1040b, 1040c, the sstable 1000 may include any suitable number of second-level index blocks 1020 based on any suitable number of data blocks 1040.

In some embodiments, the KV pairs of the sstable may include and/or otherwise correspond to attributes. In some cases, the attributes may include values of the KV pairs (e.g., KV pairs of data blocks) and/or other features (e.g., MVCC timestamps) of KV pairs. As described herein, a block property collector may encode a "block property" (also referred to as a "block property value") based on attributes of KV pairs and/or block properties of KV pairs in an sstable. A block property may summarize and/or otherwise describe qualitative and/or quantitative attributes of KV pairs in a particular block (e.g., data block or index block). A block property may provide an indication of a range and/or category(ies) corresponding to the attributes of KV pairs in a particular block. As one example, block property values may be MVCC timestamp intervals that are based on MVCC timestamps of KV pairs in data blocks of an sstable. In some cases, block property values encoded by a block property collector may be included in a BlockHandle as described herein, where the BlockHandle is a value for a particular KV pair of an index block of the sstable. Encoding a block property for a block may include encoding a block property in a BlockHandle that points to the block.

Referring to FIG. 10, the data block 1040a is shown as having KV pairs with MVCC timestamps in the interval [48, 61) based on the mapping of the respective MVCC timestamps to the BlockHandle 1030c in the second-level index block 1020a. MVCC timestamps of a particular data block 1040 may be indicated by a mapping of a key, an MVCC timestamp interval, and a BlockHandle 1030 in a second-level index block 1020. MVCC timestamps of data blocks 1040 mapped to a particular second-level index block 1030 may be indicated by a mapping of a key, an MVCC timestamp interval, and a BlockHandle 1030 in a top-level index block 1010.

A block property indicated by a KV entry in a top-level index block 1010 (e.g., indicated by a BlockHandle) may be indicative of the block properties of second-level index blocks 1020 and corresponding data blocks 1040 that are mapped to the respective top-level index block 1010. For example, a range of MVCC timestamps corresponding to the KV entries of the data blocks 1040a and 1040b is indicated by the timestamp interval [42, 61) at key e@49 in the top-level index block 1010. A block property indicated by a KV entry in a second-level index block 1020 (e.g., indicated by a BlockHandle) may be indicative of the block properties of data blocks 1040 that are mapped to the respective second-level index block 1020. For example, the timestamp interval [42, 50) at key e@49 in the second-level index block 1020a indicates a range of MVCC timestamps corresponding to the KV entries of the data block 1040b.

In some embodiments, the MVCC timestamp intervals are encoded in a BlockHandle 1030 of a data block 1040 or a second-level index block 1020. For example, MVCC timestamps could be encoded using variable length int encoding techniques (referred to as "varint" encoding) followed by varint encoding of a difference (e.g., delta) between the first encoded value of the interval and the second encoded value of the interval. For example, varint encoding of an MVCC timestamp interval for [48, 61) may be [varint(48), varint (13)). Any suitable encoding techniques for the MVCC timestamp intervals may be used. MVCC timestamps intervals are an example of a block property value that can be encoded in a BlockHandle 1030 and any suitable block property may be encoded based on a block property collector.

In some cases, an index block (e.g., top-level index block 1010 or second-level index block 1020) and a data block 1040 can include one or more block properties. In an sstable (e.g., sstable 1000), each unique string name of a block property collector can be locally mapped to a unique 8-bit (1 byte) integer that serves as an identifier for the block property in the sstable. In some cases, a sequence of block properties for an index block and/or data block can be encoded as a byte sequence. As an example, a single block property of an index block and/or data block can be encoded as a byte sequence in the following format:
Block Property Formatting: (<1-byte-property-identifier><varint-encoded-property-value-length><property-value>)

As shown above, "<1-byte-property-identifier>" can refer to an 8-bit integer that serves as a unique identifier for the block property, "<varint-encoded-property-value-length>" can refer to an encoded length of the block property value, and "<property-value>" can refer to the value for the block property for the index block and/or data block. The above-described byte sequence format may be repetitively encoded for each block property corresponding to an index block and/or a data block. For example, a data block with three block properties may include three sequential encodings of the above-described byte sequence format. In some cases, in an index block and a data block including more than one block property, block properties may be sorted according to block property identifier (referred to as a "property-id" in the above byte sequence format). Based on the addition of block properties to KV pairs of sstables, a tuple of a BlockHandle as described herein (e.g., as values in top-level and second-level index blocks) may be represented as (file-offset, block-length, properties), where "properties" is a byte array encoded in the above-described "Block Property Formatting" byte sequence format.

While FIG. 10 is described with respect to an MVCC timestamp as an exemplary block property of data blocks, any suitable block property and any suitable number of block properties may be encoded for data blocks 1040 and for corresponding second-level index blocks 1020 and a top-level index block 1010. As an example, a block property collector may encode block properties corresponding to KV pairs of an sstable that include enumerated type (enum) values, where the enum values may be course status identifiers including "Open", "Closed", "Canceled", "Waitlist", and "Closed".

Block Property Collector Interface

In some embodiments, a block property collector may be used to encode one or more block properties to BlockHandles of KV pairs during writing of an sstable. By encoding block properties in sstables, the block properties can be filtered and used to increase an efficiency of user queries directed to the data stored in an sstable. An interface of a block property collector (referred to as "BlockPropertyCollector" function) used to write to an sstable is described by Table 6.

TABLE 6

| Line | Code |
|---|---|
| 1 | // BlockPropertyCollector is used when writing an sstable. |
| 2 | // - All calls to Add are included in the next FinishDataBlock, after which |
| 3 | // the next data block is expected to start. |
| 4 | // - The index entry generated for the data block, which contains the block property |
| 5 | // value from FinishDataBlock, is not immediately included in the current |
| 6 | // index block. It is included when AddPrevDataBlockToIndexBlock is called. |
| 7 | // AddPrevDataBlockToIndexBlock must be called before keys are |
| 8 | // added to the new data block. |
| 9 | type BlockPropertyCollector interface { |
| 10 | // Name returns the name of the block property collector. |
| 11 | Name( ) string |
| 12 | // Add is called with each new entry added to a data block in the |
| 13 | // sstable. The callee can assume that these are in sorted order. |
| 14 | Add(key InternalKey, value [ ]byte) error |
| 15 | // FinishDataBlock is called when all the entries have been added to a |
| 16 | // data block. Subsequent Add calls will be for the next data block. It |
| 17 | // returns the block property value for the finished data block. |
| 18 | FinishDataBlock( ) ([ ]byte, error) |
| 19 | // AddPrevDataBlockToIndexBlock adds the block property value |
| 20 | // corresponding to the previous FinishDataBlock to the current index block. |
| 21 | AddPrevDataBlockToIndexBlock( ) |
| 22 | // FinishIndexBlock is called when an index block, containing all the |
| 23 | // KV pairs since the last FinishIndexBlock, will no longer see |
| 24 | // new entries. It returns the block property value for the index block. |
| 25 | FinishIndexBlock( ) ([ ]byte, error) |
| 26 | // FinishTable is called when the sstable is finished, and returns the |

TABLE 6-continued

| Line | Code |
|---|---|
| 27 | // block property value for the sstable. |
| 28 | Finish Table( ) ([ ]byte, error) |
| 29 | } |

Figure 11A:
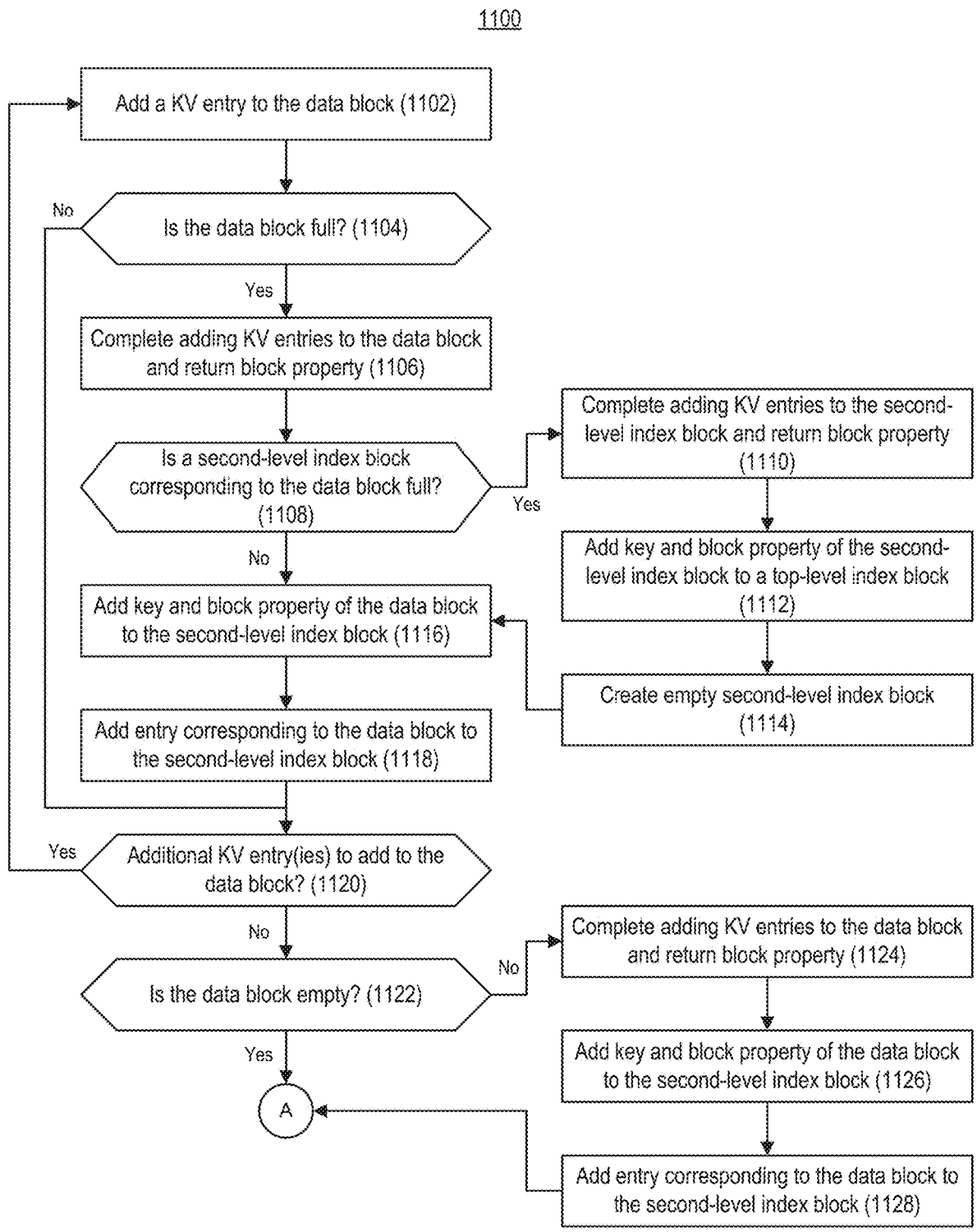
FIG. 11A shows an exemplary flowchart of a method for writing an sstable including one or more block properties, according to some embodiments.
Figure 11B:
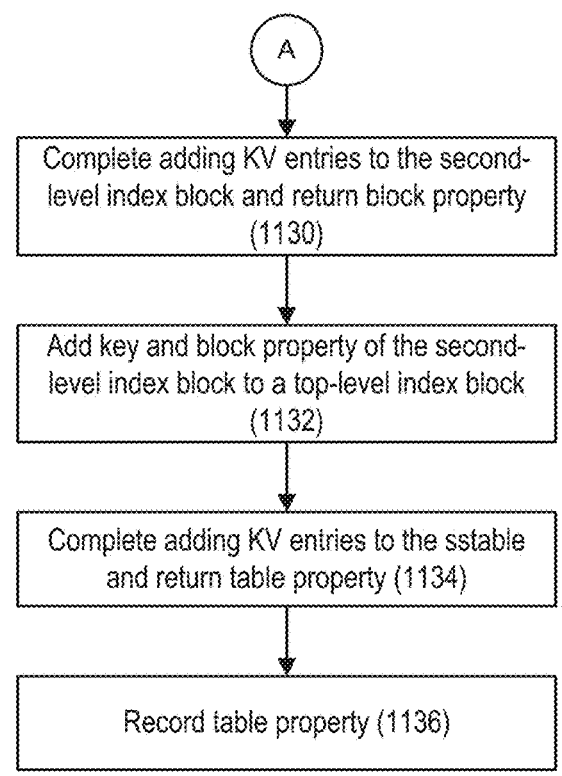
FIG. 11B shows an exemplary flowchart of a method for writing an sstable including one or more block properties, according to some embodiments.

As shown in Table 6, a BlockPropertyCollector operation can represent the functionality of a block property collector as described herein. In some embodiments, a node (e.g., node 120) of a cluster (e.g., cluster 102) may execute a method for block property collection during writing of an sstable (e.g., sstable 1000). FIGS. 11A and 11B shows an exemplary flowchart of a method 1100 for writing an sstable. The method 1100 may be executed by a node (e.g., node 120) of a cluster (e.g., cluster 102). The method 1100 may be executed for a block property collector that is configured to encode one or more block properties.

At step 1102, a node may add a KV entry to a data block of an sstable. The node may execute a BlockPropertyCollector.Add(k, v) operation in accordance with Table 6 to add the KV entry to the data block, where "k" refers to any suitable key and "v" refers to any suitable value. In some cases, adding the KV pair to the data block may include creating and/or constructing a data block prior to adding the KV pair (e.g., for the first KV pair of the sstable).

At step 1104, the node may determine whether the data block is full. Determining whether the data block is full may include determining whether the data block has reached or exceeded a threshold storage capacity. As an example, a data block may have a maximum capacity of 32 kilobytes (KB). A data block may be configured to have any suitable storage capacity. If the node determines the data block is full, the method 1100 may proceed to step 1106. If the node determines the data block is not full, the method 1100 may proceed to step 1120.

At step 1106, the node may complete adding KV entries to the data block and may return a block property corresponding to the data block. As an example, the returned block property may be an MVCC timestamp interval for the KV entries included in the data block, where the MVCC timestamp interval defines a range of MVCC timestamps corresponding to the KV entries. As another example, the returned block property may be a sequence of enum values included in the values for the KV entries included in the data block. In some cases, more than one block property may be returned. The node may execute a BlockPropertyCollector.FinishDataBlock operation in accordance with Table 6 to complete adding KV pair entries to the data block and return one or more block properties corresponding to the data block.

At step 1108, the node may determine whether a second-level index block corresponding to the data block is full. Determining whether the second-level index block is full may include determining whether the second-level index block has reached or exceeded a threshold storage capacity. As an example, an index block may have a maximum capacity of 256 kilobytes (KB). An index block may be configured to have any suitable storage capacity. If the node determines the second-level index block is full, the method 1100 may proceed to step 1110. If the node determines the second-level index block is not full, the method 1100 may proceed to step 1116.

At step 1110, the node may complete adding KV entries to the second-level index block and may return a block property corresponding to the second-level index block. As an example, the returned block property may be an MVCC timestamp interval for the KV entries of data block(s) mapped to the second-level index block, where the MVCC timestamp interval defines a range of MVCC timestamps corresponding to the KV entries. In some cases, more than one block property may be returned. The node may execute a BlockPropertyCollector.FinishIndexBlock operation in accordance with Table 6 to complete adding KV pair entries to the second-level index block and return one or more block properties corresponding to the second-level index block.

At step 1112, the node may add a key and a block property of the second-level index block (e.g., returned at step 1110) to a top-level index block. The block property may be included in a BlockHandle that points to the second-level index block as described herein, where the added key and BlockHandle form a KV entry in the top-level index block. The added key may be the last key of the second-level index block and the block property may be based on the encoded block properties included in the second-level index block. For example, the added key and block property may be e@49 and [42, 61] as shown in the top-level index block of FIG. 10, where the MVCC timestamp interval [42, 61) is based on a combination of the intervals [48, 61) and [42, 50) included in the second-level index block 420. In some cases, the node may add more than one block property of the second-level index block to the top-level index block.

At step 1114, the node may create a new, empty second-level index block.

At step 1116, the node may add a key and block property of the data block (e.g., returned at step 1106) to a second-level index block (e.g., determined at step 1108 or created at step 1114). The block property may be included in a BlockHandle that points to the data block as described herein, where the added key and BlockHandle form a KV entry in the second-level index block. The added key may be the last key of the data block and the block property may be based on the attributes included in the data block. For example, the added key and block property may be e@49 and [42, 50) as shown in the top-level index block of FIG. 10, where the MVCC timestamp interval [42, 50) is based on a combination of MVCC timestamps for the KV entries in the data block 1040b. In some cases, the node may add more than one block property of the data block to the second-level index block.

At step 1118, the node may add the KV entry corresponding to the data block to the second-level index block. Adding the KV entry corresponding to the data block to the second-level index block may include encoding a BlockHandle that maps the second-level index block to the position of the data block in the sstable file. For example, the node may encode the BlockHandle 1030c that maps the second-level index block 1020a to the data block 1040a as shown in FIG. 10. The added KV entry may include the block property in the encoded BlockHandle as described herein. The node may execute a BlockPropertyCollector.AddPrevDataBlockToIndexBlock operation in accordance with Table 6 to add the entry corresponding to the data block to the second-level index block.

At step 1120, the node may determine whether there are additional KV entries to add to the data block. If there is at least one KV entry to add to the data block, the method may return to step 1102. If there is not at least one KV entry to add to the data block, the method may proceed to step 1122.

At step 1122, the node may determine whether the data block is empty. A data block may be empty if it does not include any KV entries. If the data block is not empty, the method may proceed to step 1124. If the data block is empty, the method may proceed to step 1130.

At step 1124, the node may complete adding KV entries to the data block and may return a block property corresponding to the data block. As an example, the returned block property may be an MVCC timestamp interval for the KV entries included in the data block, where the MVCC timestamp interval defines a range of MVCC timestamps corresponding to the KV entries. In some cases, more than one block property may be returned. The node may execute a BlockPropertyCollector.FinishDataBlock operation in accordance with Table 6 to complete adding KV pair entries to the data block and return one or more block properties corresponding to the data block.

At step 1126, the node may add a key and block property of the data block (e.g., returned at step 1124) to a second-level index block (e.g., determined at step 1108 or created at step 1114). The block property may be included in a Block-Handle that points to the data block as described herein, where the added key and BlockHandle form a KV entry in the second-level index block. The added key may be the last key of the data block and the block property may be based on the attributes included in the data block. For example, the added key and block property may be e@49 and [42, 50) as shown in the top-level index block of FIG. 10, where the MVCC timestamp interval [42, 50) is based on a combination of MVCC timestamps for the KV entries in the data block 1040*b*. In some cases, the node may add more than one block property of the data block to the second-level index block.

At step 1128, the node may add the KV entry corresponding to the data block to the second-level index block. Adding the KV entry corresponding to the data block to the second-level index block may include encoding a BlockHandle that maps the second-level index block to the position of the data block in the sstable file. For example, the node may encode the BlockHandle 1030*c* that maps the second-level index block 1020*a* to the data block 1040*a* as shown in FIG. 10. The added KV entry may include the block property in the encoded BlockHandle as described herein. The node may execute a BlockPropertyCollector.AddPrevDataBlockToIndexBlock operation in accordance with Table 6 to add the entry corresponding to the data block to the second-level index block.

At step 1130, the node may complete adding KV entries to the second-level index block and may return a block property corresponding to the second-level index block. As an example, the returned block property may be an MVCC timestamp interval for the KV entries of data block(s) mapped to the second-level index block, where the MVCC timestamp interval defines a range of MVCC timestamps corresponding to the KV entries. In some cases, more than one block property may be returned. The node may execute a BlockPropertyCollector.FinishIndexBlock operation in accordance with Table 6 to complete adding KV pair entries to the second-level index block and return one or more block properties corresponding to the second-level index block.

At step 1132, the node may add a key and a block property of the second-level index block (e.g., returned at step 1130) to the top-level index block. The block property may be included in a BlockHandle that points to the second-level index block as described herein, where the added key and BlockHandle form a KV entry in the top-level index block. The added key may be the last key of the second-level index block and the block property may be based on the encoded block properties included in the second-level index block. For example, the added key and block property may be e@49 and [42, 61) as shown in the top-level index block of FIG. 10, where the MVCC timestamp interval [42, 61) is based on a combination of the intervals [48, 61) and [42, 50) included in the second-level index block 1020. In some cases, the node may add more than one block property of the second-level index block to the top-level index block.

At step 1134, the node may complete adding KV entries to the sstable and may return a table property. A table property may be a block property corresponding to a top-level index block of an sstable. As an example, a table property for the sstable 1000 of FIG. 10 may be an MVCC timestamp interval of [10, 61) based on the timestamp intervals [42, 61) and [10, 25) for the keys e@49 and k@10, respectively, of the top-level index block. In some cases, more than one table property may be returned. The node may execute a BlockPropertyCollector.FinishTable operation in accordance with Table 6 to complete adding KV entries to the sstable and return a table property.

At step 1136, the node may record a table property (e.g., returned in step 1134) for the sstable. The table property may be based on the encoded block properties included in the top-level index block. In some cases, the node may record more than one table property. The node may record the table property in a table properties block corresponding to the sstable.

Block Property Filtering

Figure 12A:
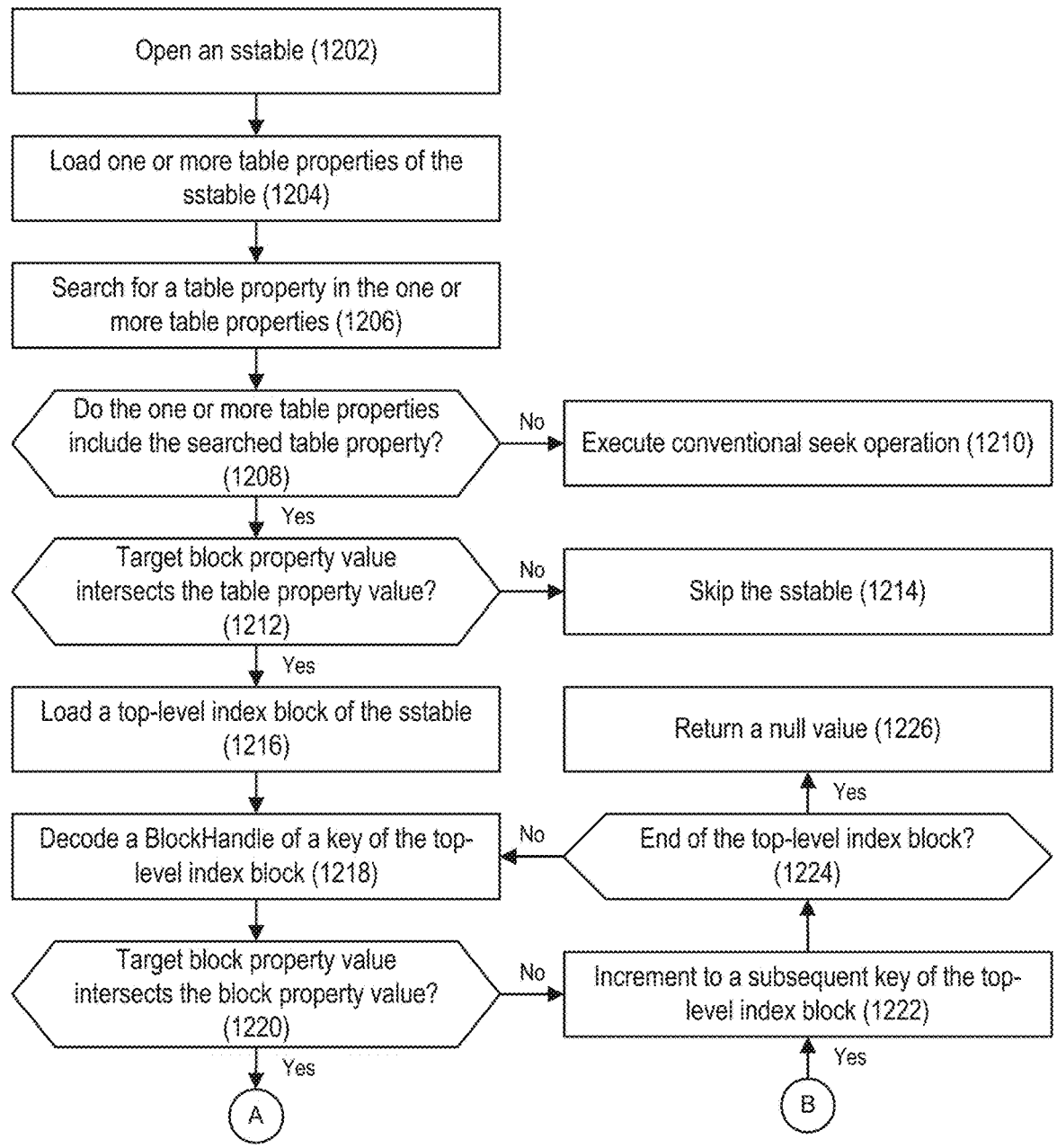
FIG. 12A shows an exemplary flowchart of a method for querying an sstable including one or more block properties, according to some embodiments.
Figure 12B:
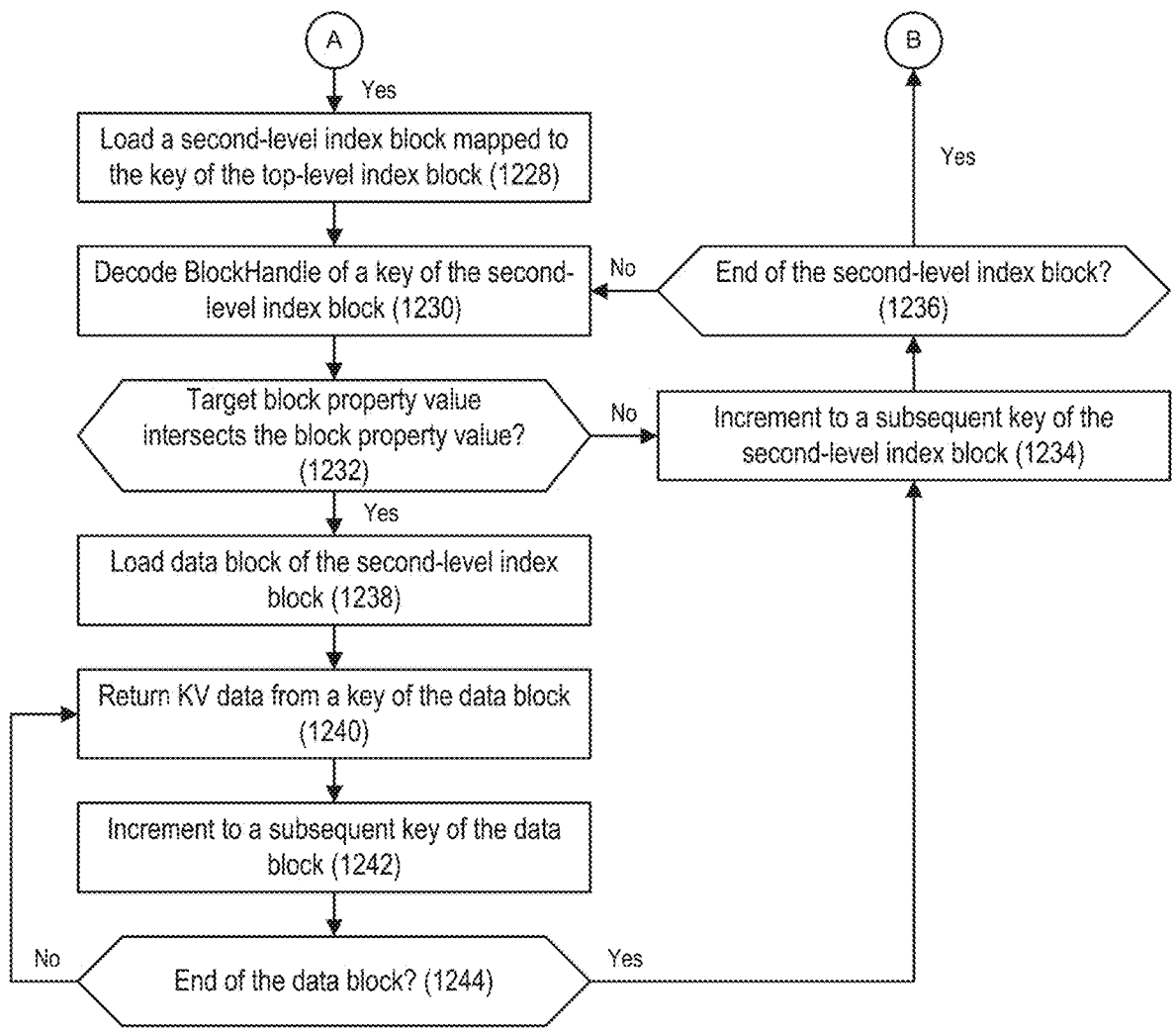
FIG. 12B shows an exemplary flowchart of a method for querying an sstable including one or more block properties, according to some embodiments.

Based on an sstable including one or more block properties (e.g., encoded as described with respect to the method 1100), block properties can be used to query the sstable. Such block properties can be used to efficiently filter out keys that are outside the interval of block property values that are of interest to a user initiating the query. For example, block properties can be used to efficiently ignore irrelevant attributes (e.g., course numbers, MVCC versions, MVCC time stamps, etc.) that are outside of the relevant range. Use of block properties can increase efficiency of user queries (e.g., read operations) and can streamline internal system management operations. FIGS. 12A and 12B show an exemplary flowchart of a method for querying an sstable including one or more block properties. The method 1200 may be executed by a node (e.g., node 120) of a cluster (e.g., cluster 102) based on a client device (e.g., client device 106) initiating a query (e.g., seek operation) for KV data stored by the cluster. A query directed to an sstable may include a search key and one or more block property values. For example, block property values corresponding to a query may include an MVCC timestamp interval, such that a user of a client device that initiated the query desires KV data that adheres to the timestamp interval. The method 1200 may be executed by an iterator including one or more features as described herein. In some cases, the iterator may execute the method 1200 as a part of a seek(k) SQL operation, where "k" is a particular search/seek key for the query. As an example, a particular search key may be and/or include an MVCC timestamp interval or a particular enum value (e.g., an "Open" course identifier as described herein).

At step 1202, to execute a seek(k) operation for a particular key "k", an iterator operating at a node (e.g., node 120) may open an sstable from a plurality of sstables. An sstable may be selected from the plurality of sstables based on a key range corresponding to the sstable as described herein. As described herein, an sstable may include one or more table properties. Opening the sstable may include accessing the sstable file, reading version information included in the sstable file (e.g., in a footer of the sstable file), and/or identifying locations of index blocks and data blocks included in the sstable file.

At step 1204, the iterator may load one or more table properties included in a table property block of the sstable. In some cases, an sstable may not include a table properties block if the sstable is not configured with any block properties.

At step 1206, the iterator may search for at least one table property in the one or more loaded table properties. The table property searched by the iterator may be a table property indicated by the seek(k) operation (as described in step 1202), such that the initiator of the operation desires to filter the seek operation based on the at least one searched table property. In some cases, the iterator may search for more than one table property. An example of a table property may be a block property for MVCC timestamps. The iterator may search according to the string names corresponding to the table properties, where a table property is a block property corresponding to a top-level index as described herein.

At step 1208, the iterator may determine whether the searched table property (e.g., from step 1206) is included in the one or more loaded table properties (e.g., from step 1204). In some cases, the iterator may determine that the searched table property is included in the one or more loaded table properties if the searched table property matches with one of the one or more loaded table properties. For example, the iterator may search for a table property with a string name of "MVCC-time-interval" in the one or more loaded table properties. If the iterator determines the searched table property (e.g., from step 1206) is not included in the one or more loaded table properties, the method may proceed to step 1210. If the iterator determines the searched table property (e.g., from step 1206) is included in the one or more loaded table properties, the method may proceed to step 1212. In some cases, the iterator may determine whether more than one searched table property is included in the one or more loaded table properties, where the method may proceed to step 1212 if at least one of the search table properties is included in the one or more loaded table properties.

At step 1210, the iterator may execute a convention seek operation for the seek(k) operation. A conventional seek operation may include executing a seek(k) operation without the use of block properties and block property filters as described herein. A conventional seek operation may include searching through each of the data blocks of an sstable to provide a response to the query.

At step 1212, the iterator may determine whether a value (e.g., interval, identifier, etc.) of a block property included in the seek operation (referred to as a "target block property value") intersects with an actual value of the table property corresponding to the sstable. A value (e.g., interval) of the block property included in the seek operation may intersect with a value of the table property corresponding to the sstable if the values overlap and/or are equal for at least part of the values. For example, for MVCC timestamp intervals as the block property, a target block property value of [12, 50) may intersect with an actual table property value of [16, 61) for the intersecting interval of [16, 50). In some cases, the iterator may perform an Intersect SQL operation for the target block property value and actual table property value. If the target block property value does not intersect with an actual value of the table property corresponding to the sstable, the method may proceed to step 1214. If the target block property value intersects with an actual value of the table property corresponding to the sstable, the method may proceed to step 1216.

At step 1214, the iterator may skip the sstable for the seek operation and may proceed to search a subsequent sstable of the plurality of sstables of the database (if available).

At step 1216, the iterator may load a top-level index block of the sstable. The top-level index block may include block property values that at least partially intersect with the target block property value described herein (e.g., for step 1212).

At step 1218, the iterator may decode a BlockHandle (e.g., BlockHandle 1030*a*) for a key of the top-level index block. The iterator may initially decode the BlockHandle for the first key of the top-level index block and may iterate through the subsequent keys of the top-level index block (if present) in future repetitions. Decoding the BlockHandle may include identifying the position of a second-level index block within the sstable (e.g., based on the file-offset value of the BlockHandle tuple), identifying the block length of the second-level index block (e.g., based on the block-length value of the BlockHandle tuple), and determining the block property of the second-level index block (e.g., based on the properties byte sequence of the BlockHandle tuple).

At step 1220, the iterator may determine whether the target block property value (e.g., of step 1212) intersects with an actual value of the block property corresponding to the second-level index block (e.g., of step 1218). The target block property value may intersect with a value of the block property corresponding to the second-level index block if the values overlap and/or are equal for at least part of the values. For example, for MVCC timestamp intervals as the block property, a target block property value of [12, 50) may intersect with an actual block property value of [24, 45) for the intersecting interval of [24, 45). In some cases, the iterator may perform an Intersect SQL operation for the target block property value and actual block property value. If the target block property value does not intersect with an actual value of the block property corresponding to the second-level index block, the method may proceed to step 1222. If the target block property value intersects with an actual value of the block property corresponding to the second-level index block, the method may proceed to step 1228.

At step 1222, the iterator may increment to a subsequent key of the top-level index block. The iterator may increment to a subsequent key based on the target block property value not intersecting with an actual value of the block property corresponding to the second-level index block. In some cases, the top-level index block may not include additional keys to increment.

At step 1224, the iterator may determine whether the end of the top-level index block has been reached. The end of the top-level index block may be reached if there are not any additional keys to increment (e.g., at step 1222) from the previous key (e.g., with a BlockHandle decoded at step 1218). If the end of the top-level index block has been reached, the method may proceed to step 1226. If the end of the top-level index block has not been reached, the method may proceed to step 1218.

At step 1226, the iterator may return a null value (or any other suitable value). The iterator may return a null value as a response to the seek operation based on searching the entirety of the sstable based on the target block property value and key.

At step 1228, the iterator may load a second-level index block mapped to the top-level index block of the sstable. The second-level index block may include block property values that at least partially intersect with the target block property value described herein (e.g., for step 1220). The second-level index block may correspond to the key and BlockHandle decoded as described herein (e.g., for step 1218).

At step 1230, the iterator may decode a BlockHandle (e.g., BlockHandle 1030*c*) for a key of the second-level index block. The iterator may initially decode the BlockHandle for the first key of the second-level index block and may iterate through the subsequent keys of the second-level index block (if present) in future repetitions. Decoding the BlockHandle may include identifying the position of a data block within the sstable (e.g., based on the file-offset value of the BlockHandle tuple), identifying the block length of the data block (e.g., based on the block-length value of the BlockHandle tuple), and determining the block property of the data block (e.g., based on the properties byte sequence of the BlockHandle tuple).

At step 1232, the iterator may determine whether the target block property value (e.g., of step 1212) intersects with an actual value of the block property corresponding to the data block (e.g., of step 1228). The target block property value may intersect with a value of the block property corresponding to the data block if the values overlap and/or are equal for at least part of the values. For example, for MVCC timestamp intervals as the block property, a target block property value of [12, 50) may intersect with an actual block property value of [31, 42) for the intersecting interval of [31, 42). In some cases, the iterator may perform an Intersect SQL operation for the target block property value and actual block property value. If the target block property value does not intersect with an actual value of the block property corresponding to the data block, the method may proceed to step 1234. If the target block property value intersects with an actual value of the block property corresponding to the data block, the method may proceed to step 1238.

At step 1234, the iterator may increment to a subsequent key of the second-level index block. The iterator may increment to a subsequent key based on the target block property value not intersecting with an actual value of the block property corresponding to the data block. In some cases, the second-level index block may not include additional keys to increment.

At step 1236, the iterator may determine whether the end of the second-level index block has been reached. The end of the second-level index block may be reached if there are not any additional keys to increment from the previous key (e.g., with a BlockHandle decoded at step 1230). If the end of the second-level index block has been reached, the method may proceed to step 1222. If the end of the second-level index block has not been reached, the method may proceed to step 1230.

At step 1238, the iterator may load a data block mapped to the second-level index block of the sstable. The data block may include attributes that at least partially intersect with the target block property value described herein (e.g., for step 1232). The data block may correspond to the key and BlockHandle decoded as described herein (e.g., for step 1230).

At step 1240, the iterator may read and return KV data for a key of the data block. The iterator may initially return KV data for the first key of the data block and may iterate through the subsequent keys of the data block (if present) in future repetitions. The iterator may return the KV data to the initiator of the seek operation by returning the KV data to a client device (e.g., client device 106) via a network.

At step 1242, the iterator may increment to a subsequent key of the data block. The iterator may increment to a subsequent key based on (e.g., after) reading and returning KV data corresponding to the key of the data block. In some cases, the data block may not include additional keys to increment.

At step 1244, the iterator may determine whether the end of the data block has been reached. The end of the data block may be reached if there are not any additional keys to increment from the previous key (e.g., with KV data read and returned at step 1240). If the end of the data block has been reached, the method may proceed to step 1234. If the end of the data block has not been reached, the method may proceed to step 1240.

Further Description of Some Embodiments

Figure 13:
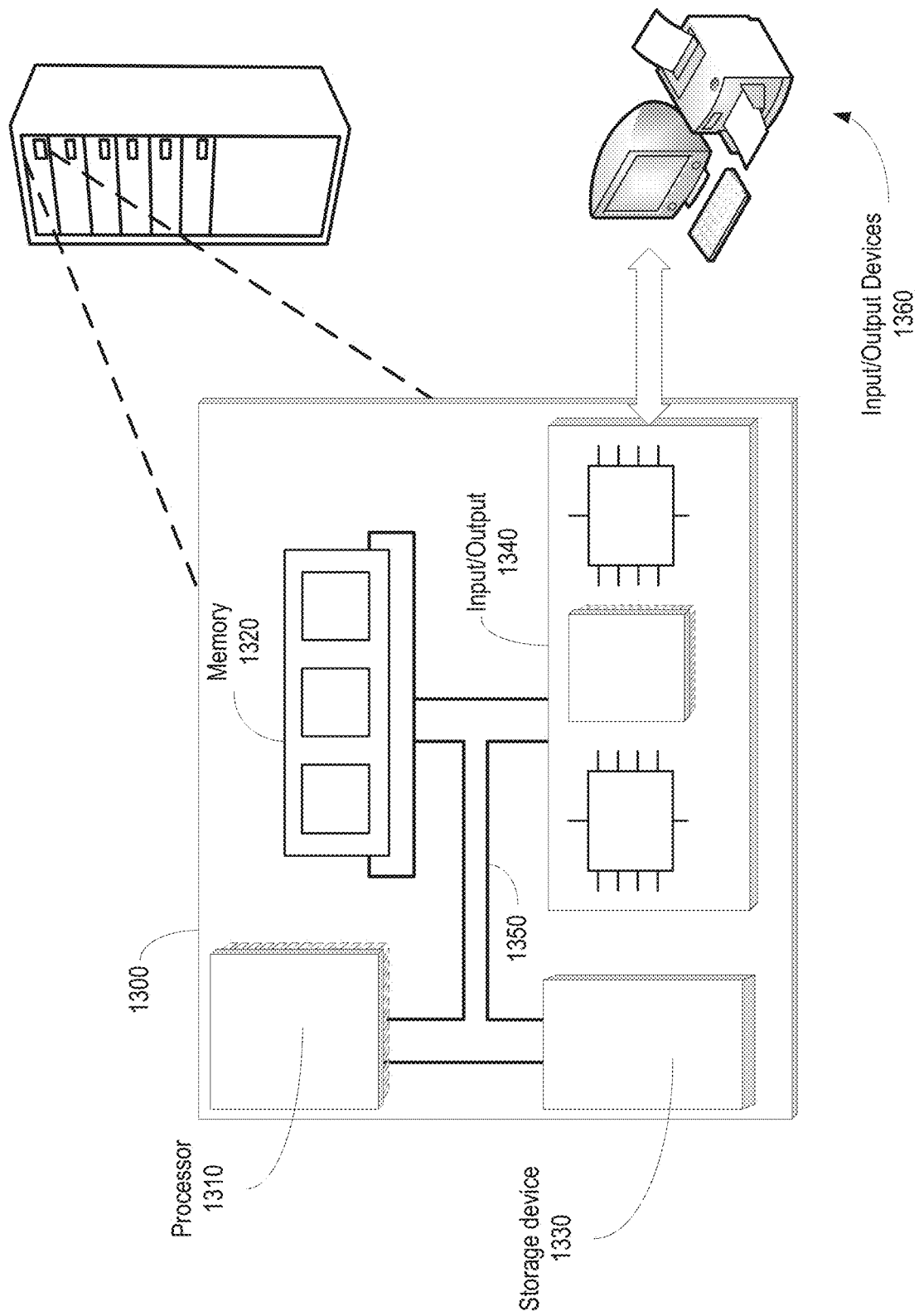
FIG. 13 is a block diagram of an example computer system, according to some embodiments.

FIG. 13 is a block diagram of an example computer system 1300 that may be used in implementing the technology described in this document. General-purpose computers, network appliances, mobile devices, or other electronic systems may also include at least portions of the system 1300. The system 1300 includes a processor 1310, a memory 1320, a storage device 1330, and an input/output device 1340. Each of the components 1310, 1320, 1330, and 1340 may be interconnected, for example, using a system bus 1350. The processor 1310 is capable of processing instructions for execution within the system 1300. In some implementations, the processor 1310 is a single-threaded processor. In some implementations, the processor 1310 is a multi-threaded processor. The processor 1310 is capable of processing instructions stored in the memory 1320 or on the storage device 1330.

The memory 1320 stores information within the system 1300. In some implementations, the memory 1320 is a non-transitory computer-readable medium. In some implementations, the memory 1320 is a volatile memory unit. In some implementations, the memory 1320 is a non-volatile memory unit.

The storage device 1330 is capable of providing mass storage for the system 1300. In some implementations, the storage device 1330 is a non-transitory computer-readable medium. In various different implementations, the storage device 1330 may include, for example, a hard disk device, an optical disk device, a solid-date drive, a flash drive, or some other large capacity storage device. For example, the storage device may store long-term data (e.g., database data, file system data, etc.). The input/output device 1340 provides input/output operations for the system 1300. In some implementations, the input/output device 1340 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1330 may be implemented in a distributed way over a network, for example as a server farm or a set of widely distributed servers, or may be implemented in a single computing device.

Although an example processing system has been described in FIG. 13, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for implementing ranged operations in a distributed computing system comprising a plurality of computing nodes, the method comprising:
receiving, from a client device, a write operation configured to write a range key and a range key value for a key span of a sorted key space defined by a start boundary key and an end boundary key, wherein the key span comprises a plurality of key-value (KV) pairs of the sorted key space;
writing, based on the write operation, the range key and the range key value for the key span; and
reading, by an iterator positioned at a first position within the key span, both a respective value of a first KV pair of the plurality of KV pairs of the key span and the range key value when a first timestamp corresponding to the range key is less than or equal to a second timestamp corresponding to the first KV pair.

2. The method of claim 1, wherein the range key comprises an identifier and the first timestamp.

3. The method of claim 1, wherein a log-structured merge tree storage engine comprises the sorted key space.

4. The method of claim 1, further comprising:
receiving, from the client device, a read operation directed to the first KV pair, wherein the read operation comprises a timestamp parameter; and
based on a determination that the second timestamp is greater than or equal to the timestamp parameter received from the client device, sending the respective value of the first KV pair to the client device.

5. The method of claim 1, wherein the write operation comprises the first timestamp, and further comprising:
comparing the first timestamp to the second timestamp; and
based on the comparison, sending the respective value of the first KV pair to the client device or not observing the respective value of the first KV pair.

6. The method of claim 5, further comprising:
when the first timestamp is less than or equal to the second timestamp:
reading, by the iterator positioned at the first position within the key span, the respective value of the first KV pair; and
sending the respective value of the first KV pair to the client device.

7. The method of claim 5, further comprising:
not observing, by the iterator positioned at the first position within the key span, the respective value of the first KV pair when the first timestamp is greater than the second timestamp.

8. The method of claim 1, further comprising:
receiving, from the client device, a second write operation configured to delete the range key and the range key value for at least a portion of the key span; and
deleting the range key and the range key value for the portion of the key span.

9. The method of claim 8, wherein the second write operation comprises a third timestamp, and wherein the deleting the range key and the range key value for the portion of the key span is based on the first timestamp being equivalent to the third timestamp.

10. The method of claim 8, wherein the second write operation is further configured to delete the range key and the range key value for the key span, and further comprising:
deleting the range key and the range key value for the key span.

11. A system for implementing ranged operations comprising:
one or more computing nodes programmed to perform operations comprising:
receiving, from a client device, a write operation configured to write a range key and a range key value for a key span of a sorted key space defined by a start boundary key and an end boundary key, wherein the key span comprises a plurality of key-value (KV) pairs of the sorted key space;
writing, based on the write operation, the range key and the range key value for the key span; and
reading, by an iterator positioned at a first position within the key span, both a respective value of a first KV pair of the plurality of KV pairs of the key span and the range key value when a first timestamp corresponding to the range key is less than or equal to a second timestamp corresponding to the first KV pair.

12. The system of claim 11, wherein the range key comprises an identifier and the first timestamp.

13. The system of claim 11, wherein a log-structured merge tree storage engine comprises the sorted key space.

14. The system of claim 11, wherein the operations further comprise:
receiving, from the client device, a read operation directed to the first KV pair, wherein the read operation comprises a timestamp parameter; and
based on a determination that the second timestamp is greater than or equal to the timestamp parameter received from the client device, sending the respective value of the first KV pair to the client device.

15. The system of claim 11, wherein the write operation comprises the first timestamp, and wherein the operations further comprise:
comparing the first timestamp to the second timestamp; and
based on the comparison, sending the respective value of the first KV pair to the client device or not observing the respective value of the first KV pair.

16. The system of claim 15, operations further comprise:
when the first timestamp is less than or equal to the second timestamp:
reading, by the iterator positioned at the first position within the key span, the respective value of the first KV pair; and
sending the respective value of the first KV pair to the client device.

17. The system of claim 15, wherein the operations further comprise:
not observing, by the iterator positioned at the first position within the key span, the respective value of the first KV pair when the first timestamp is greater than the second timestamp.

18. The system of claim 11, wherein the operations further comprise:
receiving, from the client device, a second write operation configured to delete the range key and the range key value for at least a portion of the key span; and deleting the range key and the range key value for the portion of the key span.

* * * * *